United States Patent
Hayano

(10) Patent No.: US 10,427,218 B2
(45) Date of Patent: Oct. 1, 2019

(54) POWDER BED FUSION APPARATUS

(71) Applicant: Aspect Inc., Inagi-shi (JP)

(72) Inventor: Seiji Hayano, Inagi (JP)

(73) Assignee: ASPECT INC., Tokyo (JP)

( * ) Notice: Subject to any disclaimer, the term of this patent is extended or adjusted under 35 U.S.C. 154(b) by 562 days.

(21) Appl. No.: 15/164,019

(22) Filed: May 25, 2016

(65) Prior Publication Data
US 2017/0001243 A1    Jan. 5, 2017

(30) Foreign Application Priority Data

Jul. 3, 2015    (JP) .................................. 2015-134402

(51) Int. Cl.
| | | |
|---|---|---|
| B22F 3/105 | (2006.01) |
| B29C 67/00 | (2017.01) |
| B29C 64/153 | (2017.01) |
| B29C 64/20 | (2017.01) |
| B33Y 30/00 | (2015.01) |

(Continued)

(52) U.S. Cl.
CPC .......... *B22F 3/1055* (2013.01); *B29C 64/153* (2017.08); *B29C 64/20* (2017.08); *B22F 2003/1056* (2013.01); *B22F 2003/1057* (2013.01); *B29C 64/386* (2017.08); *B33Y 30/00* (2014.12); *B33Y 50/02* (2014.12); *Y02P 10/295* (2015.11)

(58) Field of Classification Search
CPC ..... B29C 64/20; B29C 64/153; B29C 64/386; B22F 3/1055; B22F 2003/1056; B22F 2003/1057
See application file for complete search history.

(56) References Cited

U.S. PATENT DOCUMENTS

| | | | | |
|---|---|---|---|---|
| 5,002,854 A | * | 3/1991 | Fan ....................... | G03F 7/0037 264/482 |
| 5,182,056 A | * | 1/1993 | Spence ................. | G01J 1/4257 118/423 |

(Continued)

FOREIGN PATENT DOCUMENTS

| | | |
|---|---|---|
| JP | 2003-245981 A1 | 9/2003 |
| JP | 2003-531034 A1 | 10/2003 |

(Continued)

OTHER PUBLICATIONS

Notification of Reasons for Refusal in Japanese Application No. 2015-134402, dated Nov. 8, 2018, including full English translation (7 pages).

*Primary Examiner* — Joseph S Del Sole
*Assistant Examiner* — Emmanuel S Luk
(74) *Attorney, Agent, or Firm* — Kratz, Quintos & Hanson. LLP

(57) ABSTRACT

A powder bed fusion apparatus has an energy beam emitting section for outputting an energy beam, a thin layer forming section for forming a thin layer of a powder material, preliminary heating means for pre-heating the thin layer of the powder material, and control means for controlling modeling, wherein the control means performs forming the thin layer of the powder material, pre-heating the thin layer of the powder material, and modeling based on slice data, in which irradiation of the energy beam is started from the central region of the thin layer, and sequentially moved to a peripheral region of the thin layer.

4 Claims, 26 Drawing Sheets

(51) Int. Cl.
*B33Y 50/02* (2015.01)
*B29C 64/386* (2017.01)

(56) References Cited

U.S. PATENT DOCUMENTS

| | | | | |
|---|---|---|---|---|
| 5,837,960 | A * | 11/1998 | Lewis | B23K 26/34 |
| | | | | 219/121.63 |
| 6,635,112 | B1 * | 10/2003 | Choy | B29C 64/135 |
| | | | | 118/300 |
| 6,646,728 | B1 * | 11/2003 | Tang | G01J 1/4257 |
| | | | | 356/121 |
| 9,636,769 | B2 * | 5/2017 | Goehler | B22F 3/1055 |
| 9,982,684 | B2 * | 5/2018 | Moricca | B23K 26/342 |
| 2004/0026807 | A1 | 2/2004 | Andersson | |
| 2008/0169587 | A1 * | 7/2008 | Kihara | B22F 3/008 |
| | | | | 264/408 |
| 2009/0206065 | A1 * | 8/2009 | Kruth | B22F 3/1055 |
| | | | | 219/121.66 |
| 2010/0007062 | A1 | 1/2010 | Larsson | |
| 2010/0233012 | A1 | 9/2010 | Higashi | |
| 2012/0211926 | A1 | 8/2012 | Larsson | |
| 2013/0300035 | A1 | 11/2013 | Snis | |
| 2014/0265049 | A1 * | 9/2014 | Burris | B23K 26/034 |
| | | | | 264/497 |
| 2015/0050463 | A1 | 2/2015 | Nakano | |
| 2015/0174827 | A1 | 6/2015 | Schwarze | |
| 2017/0239724 | A1 * | 8/2017 | Diaz | B22F 3/1055 |
| 2018/0264551 | A1 * | 9/2018 | Ishikawa | B33Y 10/00 |
| 2018/0264552 | A1 * | 9/2018 | Herzog | B33Y 30/00 |
| 2018/0290209 | A1 * | 10/2018 | Foster | B22F 3/1055 |
| 2018/0297116 | A1 * | 10/2018 | Brunhuber | B22F 3/1055 |
| 2018/0326482 | A1 * | 11/2018 | Sasaki | B22F 3/105 |
| 2018/0333918 | A1 * | 11/2018 | Sohn | B22F 3/105 |

FOREIGN PATENT DOCUMENTS

| | | |
|---|---|---|
| JP | 2007-307742 A1 | 11/2007 |
| JP | 2008-155538 A1 | 7/2008 |
| JP | 2009-108350 A1 | 5/2009 |
| JP | 2009-132127 A1 | 6/2009 |
| JP | 2009-544501 A1 | 12/2009 |
| JP | 2010-173123 A1 | 8/2010 |
| JP | 2014-508668 A1 | 4/2014 |
| JP | 2015-38237 A1 | 2/2015 |
| JP | 2015-128898 A1 | 7/2015 |

* cited by examiner

FIG.10

| Recoater | | on Flange | on Thin layer forming container | on Flange | on Container on housing side of powder material | Waiting for temperature elevation | Laser beam irradiation | on Container on feeding side of powder material |
|---|---|---|---|---|---|---|---|---|
| | | Moving | Moving | Moving | Moving (Deceleration moving) | Stop | Stop | Moving (Acceleration moving) |
| Time (second) | | T1 | T2+Tpd | T3 | T4 | Tw | TL | T5 |
| | | 0.8 | 3.3 | 0.8 | 1.5 | 3 | 30 | 3 |
| Example | | ○ | ○ | × | × | unnecessary | ○ | × |
| Drawings | | FIGs.9H~9I | FIGs.9H~9I | FIGs.9J~9K | FIGs.9J~9K | — | FIGs.9J~9M | FIGs.9L~9M |
| Comparative example | | ○ | ○ | ○ | ○ | ○ | ○ | ○ |
| Drawings | | FIGs.15B~15C | FIGs.15B~15C | FIGs.15B~15C | FIGs.15B~15C | FIGs.15D | FIGs.15E~15F | According to FIGs.15E~15F |

○: Need for performing separately from laser beam irradiation (Impossible to shorten time)
×: Possible to perform in concurrently running manner during laser beam irradiation (Possible to shorten time)

POWDER BED FUSION APPARATUS

CROSS-REFERENCE TO RELATED APPLICATION

This application is based on and claims priority of Japanese Patent Application No. 2015-134402 filed on Jul. 3, 2015, the entire contents of which are incorporated herein by reference.

FIELD

The present invention relates to a powder bed fusion apparatus.

BACKGROUND

A powder bed fusion apparatus, as illustrated in FIG. 13, is equipped with a laser beam outputting section (energy beam emitting section) 201, a thin layer forming section 202 where a thin layer of a powder material is formed and then the layer is fused by a laser beam (energy beam) to perform modeling, a recoater 60 which moves on a surface of the thin layer forming section 202 and carries the powder material, and a control section 203 which controls modeling.

Further, the thin layer forming section 202, as illustrated in FIG. 14, is equipped with powder material housing containers 52a, 52b which house a powder material 59, and a thin layer forming container 51 in which a thin layer 59a of the powder material is formed. Furthermore, the thin layer forming container 51 has a built-in heater, and heaters 54a, 54b or an infrared lamp are also arranged around the thin layer forming container 51.

By using the powder bed fusion apparatus, as illustrated in FIGS. 15A to 15C, the powder material 59 from the powder material housing container 52a is carried into the thin layer forming container 51 to form the thin layer 59a of the powder material on a part table 55, and furthermore, a residual powder material is housed into the powder material housing container 52b.

Next, as illustrated in FIGS. 15D to 15F, a certain region of the thin layer 59a is heated by a laser beam 61, and the region is melted and solidified to form a subsequently solidified layer 59b as the first layer.

Subsequently, the recoater 60 is moved to the left according to the above-described action to form a subsequently solidified layer 59b as the second layer and so on.

After that, the above-described actions are repeated. Thus, the subsequently solidified layers 59b and the like are stacked for several hundred layers or several thousand layers to fabricate a three-dimensional model.

Herein, the thin layer 59a of the powder material formed in the thin layer forming container 51 is preliminarily heated to temperature near melting temperature of the powder material 59 by the heater or the like before irradiation of the laser beam 61.

Patent Documents (Japanese Patent Laid-open No. 2008-155538, No. 2010-173123 etc.) describe such a powder bed fusion method.

However, immediately after the thin layer 59a of the powder material is formed, temperature of a peripheral region of the thin layer 59a generally tends to be lower than that of a central region, and thus uniformity of temperature in the entire thin layer 59a is not maintained. When the laser beam 61 is irradiated in such a state, a temperature difference between a melted area and its surrounding area becomes larger, which causes generation of warp.

Therefore, as illustrated in FIG. 15D, irradiation of the laser beam 61 is performed after a temperature is stabilized at a set temperature and becomes even on the entire thin layer 59a of the powder material in the thin layer forming container 51.

However, even after housing the residual powder material 59 into the powder material housing container 52b, about a few seconds of waiting time is still necessary per one subsequently solidified layer. For this reason, time loss becomes very large when several thousand subsequently solidified layers are stacked.

SUMMARY

It is an object of the present invention to provide a powder bed fusion apparatus capable of shortening time required for modeling while preventing warp of a subsequently solidified layer.

According to one aspect of the disclosed technology, there is provided a powder bed fusion apparatus having an energy beam emitting section for outputting an energy beam, a thin layer forming section for forming a thin layer of a powder material, preliminary heating means for pre-heating the thin layer of the powder material, and control means for controlling modeling, wherein the control means performs forming the thin layer of the powder material, pre-heating the thin layer of the powder material, and modeling based on slice data, in which irradiation of the energy beam is started from the central region of the thin layer, and sequentially moved to a peripheral region of the thin layer.

The object and advantages of the invention will be realized and attained by means of the elements and combinations particularly pointed out in the claims.

It is to be understood that both the foregoing general description and the following detailed description are exemplary and explanatory and are not respective of the invention, as claimed.

BRIEF DESCRIPTION OF THE DRAWINGS

FIG. 10 is a table illustrating results in which time required for modeling per one subsequently solidified layer is comparatively investigated in the powder bed fusion method according to the first embodiment of the present invention.

FIG. 16A is a top view illustrating a surface of the thin layer of the powder material in a thin layer forming container, and FIG. 16B are graphs illustrating temporal changes (t0, t1, t2) of temperature distribution at a surface of the thin layer of the powder material taken along III-III line of FIG. 16A.

DESCRIPTION OF THE PREFERRED EMBODIMENTS

Figure 1:
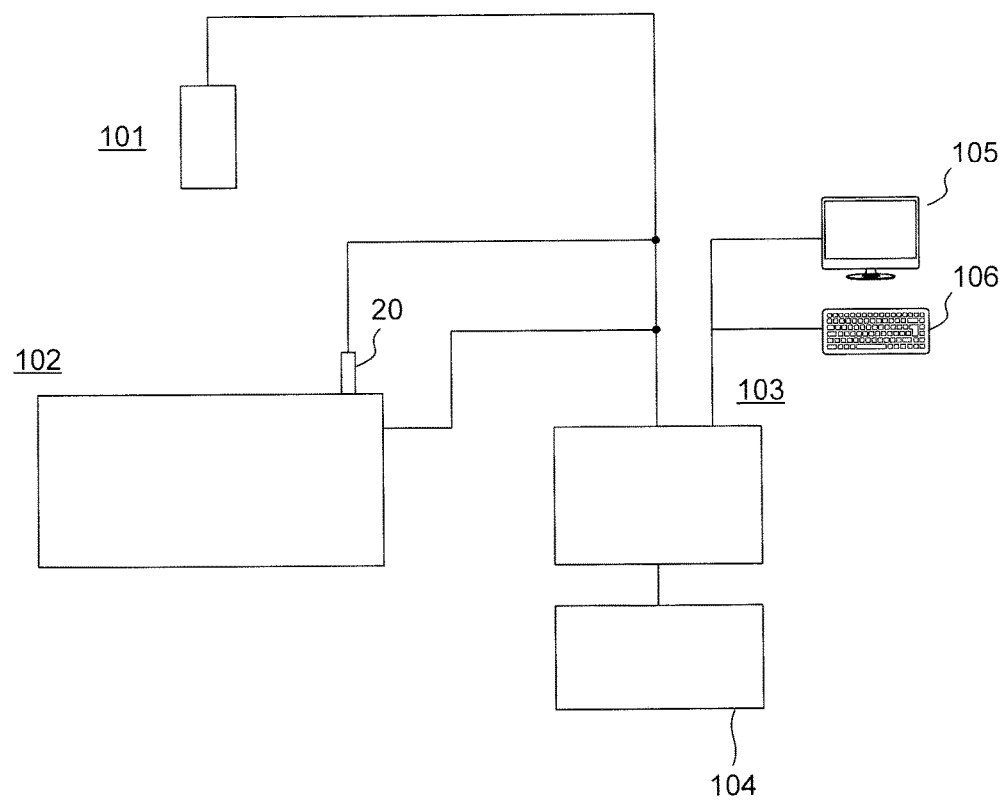
FIG. 1 is a view illustrating a powder bed fusion apparatus according to a first embodiment of the present invention.

Hereinafter, embodiments of the present invention will be explained referring to the drawings.

(Preliminary Item)

The present inventors focused on waiting time until the temperature of the entire thin layer reaches temperature (lower limit temperature for starting laser beam irradiation) or higher at which irradiation of a laser beam (energy beam) can be started after formation of a thin layer of a powder material, and considered shortening of the waiting time.

Figure 16A:
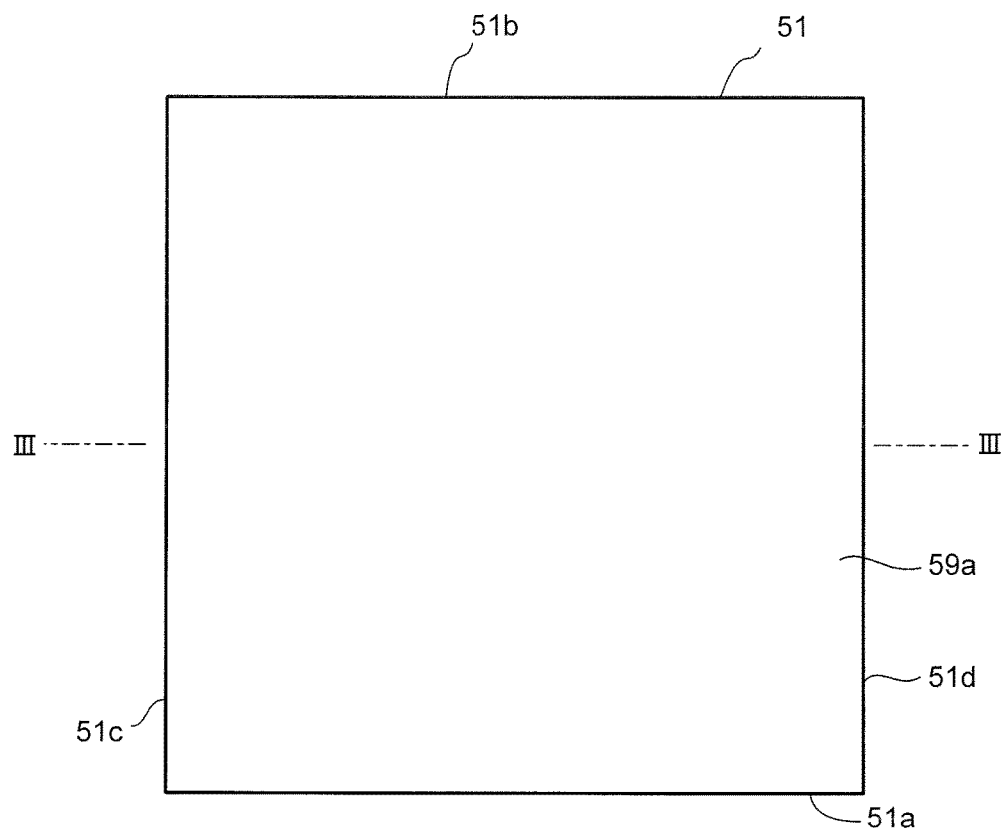
FIG. 16A and FIG. 16B are views explaining investigation for improving the problem of the powder bed fusion method.
Figure 16B:
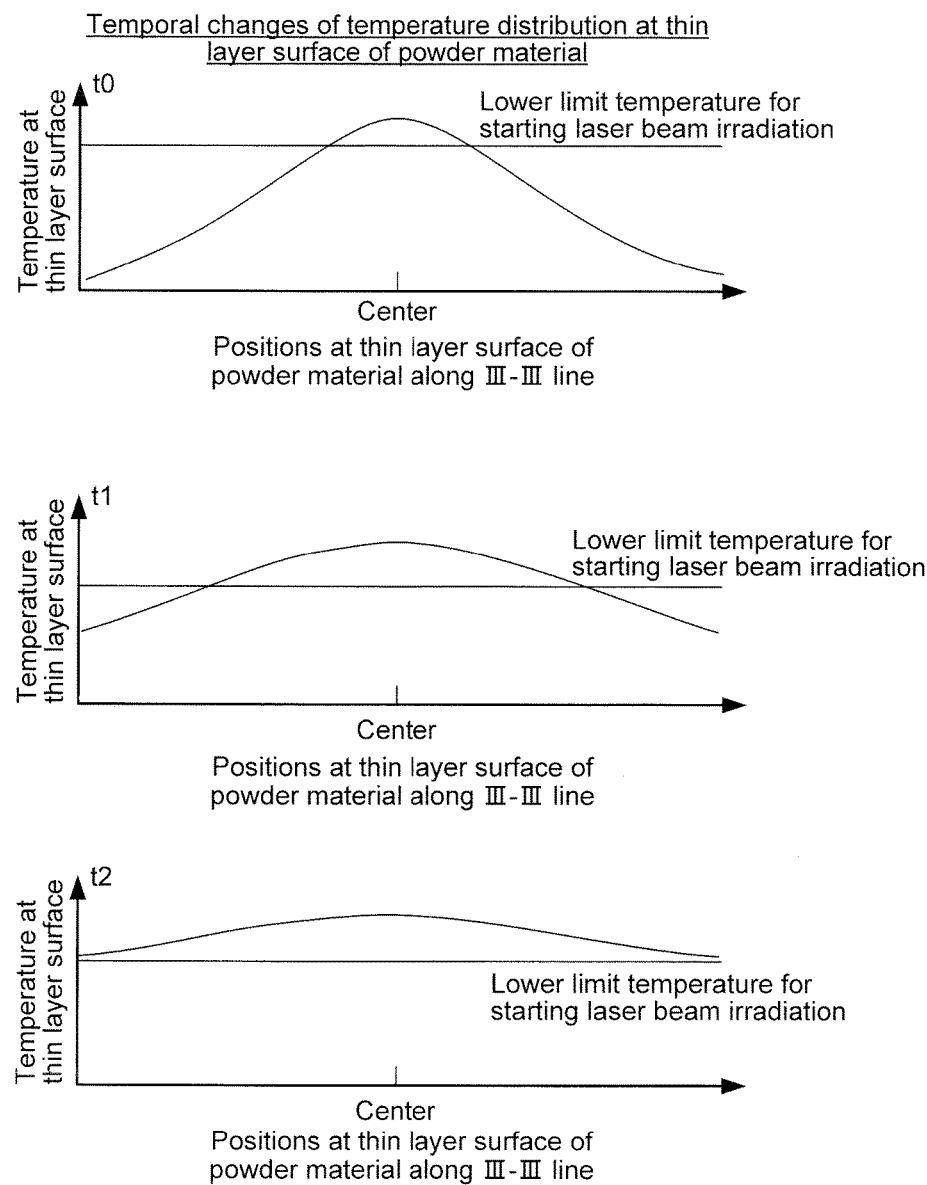

According to an investigation of the present inventors, it was found out that the temperature distribution of the thin layer $59a$ changed over time until the temperature of the entire thin layer $59a$ in the thin layer forming container $51$ reached the lower limit temperature for starting laser beam irradiation or higher as illustrated in FIG. 16B after formation of the thin layer $59a$ of the powder material illustrated in FIG. 16A.

FIG. 16A is a plan view illustrating the surface of the thin layer $59a$ of the powder material in the thin layer forming container $51$, a dashed-dotted line connecting III-III is a line that passes through the center of the thin layer forming container $51$ and drawn parallelly with a front rim $51a$ and a rear rim $51b$ of the thin layer forming container $51$. Note that reference numerals $51c$ and $51d$ respectively denote a left rim and a right rim of the thin layer forming container $51$.

FIG. 16B are graphs illustrating how the temperature distribution taken along III-III line of the thin layer $59a$ of the powder material changes over time at time t0, t1, t2, respectively. A horizontal axis denotes positions in the thin layer forming container $51$ taken along III-III line of FIG. 16A in a linear scale, and a vertical axis denotes the temperature of the thin layer $59a$ in a linear scale. Reference symbols t0, t1, t2 in the drawing denote elapsed time which sequentially increases, and a line drawn parallel to the horizontal axis, which expresses constant temperature, denotes the lower limit temperature for starting laser beam irradiation.

As illustrated in FIG. 16B, immediately after the formation of the thin layer $59a$ (expressed by time t0), only the central region of the thin layer $59a$ exceeds the lower limit temperature for starting laser beam irradiation. The temperature of a peripheral region of the thin layer $59a$ gradually rises with the lapse of time (time t1 to t2). Then, the entire thin layer $59a$ reaches the lower limit temperature for starting laser beam irradiation or higher at time t2.

According to the investigation result of FIG. 16, a region whose temperature reaches the lower limit temperature for starting laser beam irradiation or higher spreads from the central region toward a peripheral region over time. Therefore, when a laser beam is moved from the central region to the peripheral region in accordance with the spread and the thin layer is irradiated with the laser beam sequentially along with the movement, the laser beam can be irradiated to a temperature-stabilized region immediately after the formation of the thin layer. From this point of view, the inventors considered that waiting time could be shortened.

Based on the above-described finding, the inventors thought up an invention that a top surface region inside the thin layer forming container $51$ is divided into a plurality of regions, irradiation of a laser beam is instantly started from a central divided region in a temperature-stabilized region without waiting for temperature rise of the entire thin layer $59a$ after forming the thin layer $59a$, and then the irradiation of the laser beam is sequentially moved to a peripheral divided region whose temperature is on the rise.

First Embodiment (1) Powder Bed Fusion Apparatus

FIG. 1 is a schematic diagram illustrating a configuration of a powder bed fusion apparatus according to this embodiment.

Note that there are a laser beam source outputting a laser beam and a particle beam source outputting particle beams as typified by an electron beam source outputting an electron beam as an energy beam source outputting an energy beam which fuses a powder material, and the beam sources can be applied to the present invention. Hereinafter, explanation will be made using the laser beam source out of them.

As illustrated in FIG. 1, the powder bed fusion apparatus is equipped with a laser beam outputting section $101$, a thin layer forming section $102$ on which modeling is performed, and a control section (control means) $103$ which controls modeling.

Note that reference numeral $20$ denotes a recoater (carrying member of powder material) provided on a top surface of the thin layer forming section $102$. The recoater $20$ is included in the thin layer forming section $102$.

The control section $103$ is connected to the laser beam outputting section $101$ and the thin layer forming section $102$, communicates (sends and receives) electric signals with each section $101$, $102$ to control each section $101$, $102$, and thus controls modeling. Consequently, it is possible to control modeling automatically.

Hereinafter, details of each section $101$, $102$, $103$ in this powder bed fusion apparatus will be explained.

Figure 2A:
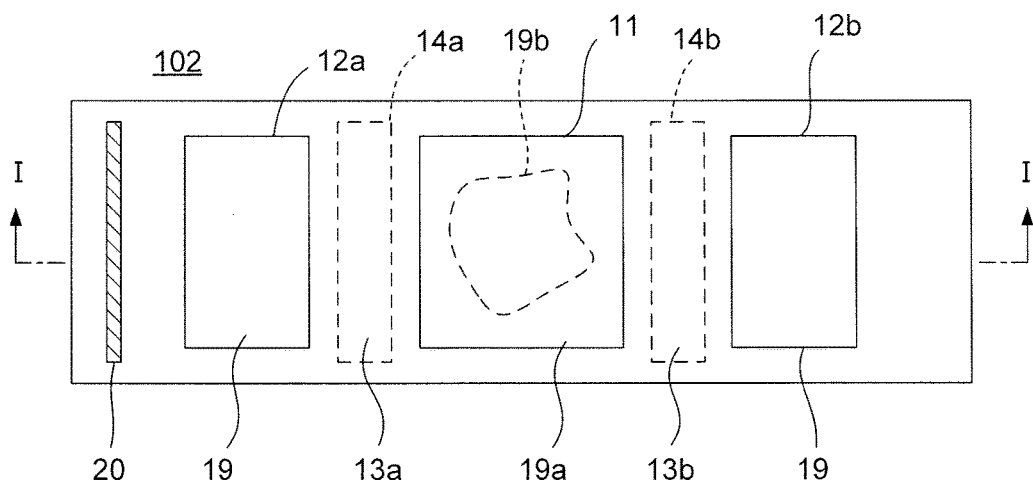
FIG. 2A is top view illustrating the powder bed fusion apparatus of FIG. 1.
Figure 2B:
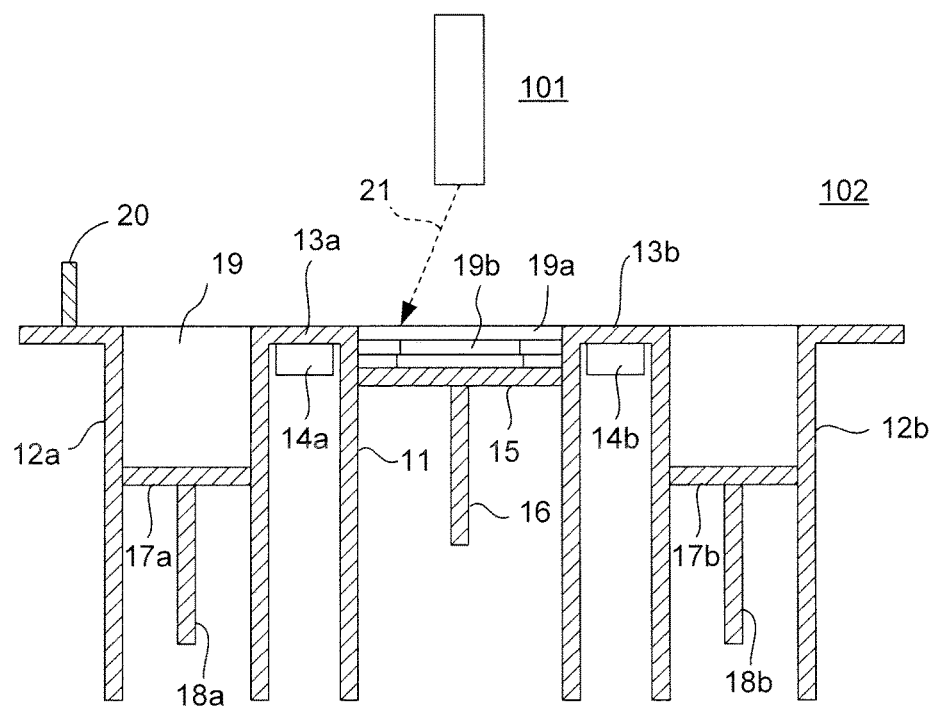
FIG. 2B is a cross-sectional view taken along I-I line of FIG. 2A.

FIG. 2A and FIG. 2B are views illustrating configurations of the laser beam outputting section $101$ and the thin layer forming section $102$. FIG. 2A is a top view, and FIG. 2B is a cross-sectional view taken along I-I line of FIG. 2A. Note that the laser beam outputting section 101 is omitted in FIG. 2A.

(i) Configuration of the Laser Beam Outputting Section 201

The laser beam outputting section 101 illustrated in FIG. 2B is equipped with a laser beam source, an optical system, and an XYZ driver.

As the laser beam source, a YAG laser beam source which outputs a laser beam near a wavelength 1,070 nm, a fiber laser beam source, a high-output $CO_2$ laser beam source which outputs a laser beam of a wavelength 10.6 μm, or the like is mainly used. Different wavelengths are appropriately used on the basis of taking not only wavelength absorptance of a powder material 19 but also cost performance or the like in consideration.

Note that a semiconductor laser (LD) having a wavelength from about 700 nm to 940 nm is not used often because sufficient output for melting metal cannot be obtained yet from it, but if a high-output semiconductor laser is obtained in future, it is preferable to use such a semiconductor laser. This is because the shorter the wavelength, the higher the laser beam absorptance of metal.

Further, in the case of using resin powder as well, it is possible to use the semiconductor laser (LD) by adding absorber such as carbon black which absorbs semiconductor laser or pigment. A shorter wavelength is advantageous on the point that a laser beam diameter can be made narrower.

The optical system has a galvanometer mirror (constituted of X mirror and Y mirror) and a lens.

Note that in the case of using another energy beam source instead of the laser beam source as an energy beam source, the optical system can be appropriately changed depending on the energy beam source. For example, an electromagnetic lens and a polarizing system can be used in the case of the electron beam source.

The XYZ driver sends out a control signal for activating the X mirror, the Y mirror, and the lens together with the laser beam source in response to a control signal from the control section 103, and makes them perform an action as follows.

Specifically, based on slice data (drawing pattern) of a three-dimensional model to be fabricated, angles of the X mirror and the Y mirror are changed to allow a laser beam 21 to scan and the laser beam source is appropriately turned ON to OFF or OFF to ON.

During this action, the lens is constantly moved in response to the movement of the laser beam 21 such that the laser beam 21 focuses on a surface of a thin layer 19a of the powder material.

The thin layer 19a of the powder material is selectively irradiated with the laser beam 21 in this manner to heat a certain region. The thin layer 19a of the powder material is melted by controlling an electric power added to the laser beam source.

Note that "melt" includes both of a mode of melting and fluidizing the entire powder particles and a mode of melting mainly the surface of powder particles such as the case of sintering. The same is applied to the following explanation.

Further, in the following explanation, temperature at which the above-described two "melting" modes appear are expressed as "melting temperature".

Further, a layer in which the thin layer 19a is solidified after being melted in the above-described two modes is expressed as a "subsequently solidified layer", which implicates a state such that the layer is fused to an underlayer contacting the layer.

(ii) Configuration of the Thin Layer Forming Section 102

The thin layer forming section 102, as illustrated in FIG. 2A and FIG. 2B, is equipped with a thin layer forming container 11 in which modeling is performed, a first powder material housing container 12a and a second powder material housing container 12b installed on both sides of the container 11, and the recoater (powder material conveying means) 20 which carries the powder material 19 and forms the thin layer 19a of the powder material.

Further, a left flange 13a is provided between the thin layer forming container 11 and the first powder material housing container 12a, and a right flange 13b is provided between the thin layer forming container 11 and the second powder material housing container 12b.

The first powder material housing container 12a, the left flange 13a, the thin layer forming container 11, the right flange 13b, and the second powder material housing container 12b are joined such that their top surfaces become flush with each other. Consequently, the recoater 20 can move smoothly on the top surfaces of all containers 12a, 11, 12b across the entire region.

In the thin layer forming container 11, as illustrated in FIG. 2B, the thin layer 19a of the powder material is formed on a part table (first elevating table) 15 which doubles a bottom of the container 11, the thin layer 19a of the powder material is irradiated with the laser beam 21, and a subsequently solidified layer 19b is formed.

Then, the part table 15 is sequentially moved downward to stack the subsequently solidified layers 19b, and a three-dimensional model is fabricated.

In the first powder material housing container 12a, the powder material 19 is housed on a first feed table (second elevating table) 17a that doubles the bottom of the container 12a. In the second powder material housing container 12b, the powder material 19 is housed on a second feed table (third elevating table) 17b that doubles the bottom of the container 12b.

In the case where either one of the first powder material housing container 12a and the second powder material housing container 12b is a feeding side of the powder material 19, the other one is a housing side of the powder material 19 which is residual after forming the thin layer 19a of the powder material.

Support shafts 16, 18a and 18b are attached to respective under surfaces of the part table 15, the first feed table 17a, and the second feed table 17b. The support shafts 16, 18a and 18b are connected to drivers (not illustrated) which vertically move the support shafts 16, 18a and 18b.

The drivers are controlled by a control signal from the control section 103. Thus, the feed table 17a or 17b on the feeding side is elevated to supply the powder material 19, and the feed table 17b or 17a on the housing side is lowered to house the residual powder material 19.

The recoater 20 is controlled by the control signal from the control section 103 and moves on the top surfaces of the first powder material housing container 12a, the thin layer forming container 11, and the second powder material housing container 12b across the entire region.

The recoater 20 moves on the powder material housing container 12a or 12b on the feeding side while pushing forward and taking off the powder material 19 on the powder material housing container 12a or 12b, and then carries the material into the thin layer forming container 11 while leveling the surface of the powder material 19 to form the thin layer 19a on the part table 15. Furthermore, the recoater carries the residual powder material 19 to the powder material housing container 12b or 12a on the housing side, and houses it on the feed table 17b or 17a.

Further, in order to preliminary heat to increase the temperature of the powder material 19 housed in the containers 12a and 12b and the thin layer 19a of the powder material in the container 11, heaters (heating means) (not illustrated) are built in partition walls of the containers 11, 12a and 12b or the elevating tables 15, 17a and 17b, in addition or alternatively, heaters (heating means) are provided around the containers 11, 12a and 12b. Further, infrared irradiation means (heating means) may be provided as well. Of the heating means, heaters 14a, 14b are illustrated under the left flange 13a and the right flange 13b in FIG. 2A, FIG. 2B.

(Powder Material)

As the usable powder material 19, there are resin powder and ceramics powder. Or there are aluminum, aluminum alloy, titanium and other metal powders.

(iii) Division Mode for a Surface of the Thin Layer of the Powder Material and a Control Method for Controlling Powder Bed Fusion (a) First Division Mode and a Control Method Based on the First Division Mode (First Division Mode)

Figure 3:
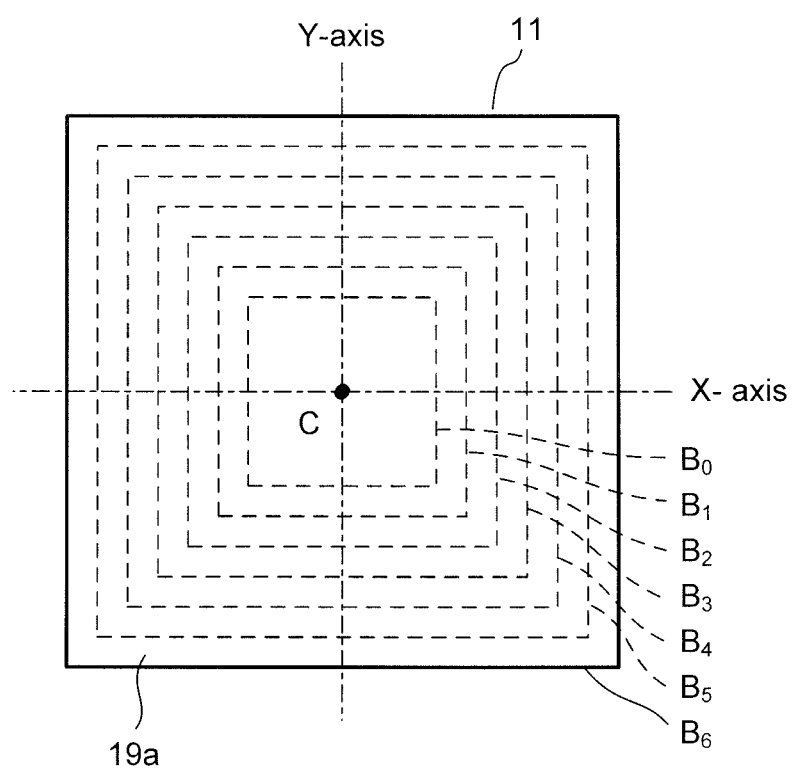
FIG. 3 is a plan view illustrating a first division mode for a surface of the thin layer of the powder material according to the first embodiment of the present invention.

FIG. 3 is a plan view illustrating a first division mode on which divided regions are set on the thin layer 19a of the powder material in the thin layer forming container 11.

In FIG. 3, the divided regions are set on the premise that temperature isotropically spreads from the central part with the lapse of time at an inner top surface of the thin layer forming container 11.

Specifically, 6 concentric circles around a center C of the inner top surface of the thin layer forming container 11 are temporarily set, and 6 squares $B_0$ to $B_5$ inscribed in the concentric circles are set, respectively.

Each square $B_0$ to $B_5$ is similar to the shape of an inner edge portion of the top surface of the thin layer forming container 11. Therefore, the inner edge portion of the thin layer forming container 11 is equivalent to the outermost square $B_6$ corresponding to spreading of temperature.

Each square $B_0$ to $B_6$ is a boundary of divided regions corresponding to elapsed time since from immediately after the formation of the thin layer 19a. Then, a region inside each boundary $B_0$ to $B_6$ is regarded to correspond to the temperature-stabilized region where temperature is not lower than the lower limit temperature for starting laser beam irradiation as explained in FIG. 16B.

The boundary $B_0$ of the innermost divided region indicates a boundary of a temperature-stabilized region (at time of 0 second) immediately after the formation of the thin layer 19a of the powder material. Further, the boundaries $B_1$ to $B_6$ outside the boundary $B_0$ indicate boundaries of the temperature-stabilized regions spreading with the lapse of time from immediately after the formation of the thin layer 19a. Herein, respective subscript figures of the boundaries $B_1$ to $B_6$ indicate that as each of the subscript figures becomes larger, time gradually elapses from immediately after the formation of the thin layer 19a.

Note that time until temperature is stabilized changes depending on a type of the powder material, an arrangement of the heating means or the like. Therefore, it is preferable to appropriately set elapsed time corresponding to the boundary of each divided region depending on the type of the powder material, the arrangement of the heating means or the like based on experiment results or the like.

For example, based on the experiment result by using titanium for the powder material, the temperature of an inner region of the thin layer forming container 11 is stabilized over the entire region in approximately 6 seconds. According to the experiment result, the respective 6 squares denoted by $B_1$ to $B_6$ express boundaries of divided regions which are sequentially set every elapsed time by 1 second from immediately after the formation of the thin layer 19a. In such a case, the inner edge portion of the thin layer forming container 11 is the boundary $B_6$ at the elapsed time of 6 seconds. This means that the entire inner region of the thin layer forming container 11 reaches a temperature to be not lower than the lower limit temperature for starting laser beam irradiation in 6 seconds or more.

When X-axis and Y-axis passing through the center C of the inner top surface of the thin layer forming container 11 are set, the boundary of each divided region can be specified on the X-Y coordinate, and thus the positions of the boundaries can be stored into a memory (storage device) 104 which is connected to the control section 103 as illustrated in FIG. 1.

(Control Method Based on the First Division Mode)

Next, a control method for performing powder bed fusion based on the first division mode of FIG. 3 will be explained.

Incidentally, because time required for modeling significantly fluctuates depending on how to irradiate a laser beam, there is a fear of wasting a precious effect of shortened waiting time.

Therefore, first, how to irradiate the laser beam will be explained referring to FIG. 8A to FIG. 8D hereinafter.

Next, a control method based on the first division mode will be explained referring to FIG. 4A to FIG. 4F (first example), FIG. 5A to FIG. 5E (second example), and FIG. 6A, FIG. 6B (third example).

(An Irradiation Manner of the Laser Beam)

In the following explanation, movements of a laser beam in a vertical direction and in a lateral direction are relative to each other with respect to slice data. Specifically, when an arrangement of the slice data is rotated by 90 degrees, the movement of the laser beam in a vertical direction corresponds to that in a lateral direction with respect to the slice data, and the movement of the laser beam in a lateral direction corresponds to that in a vertical direction with respect to the slice data.

The slice data illustrated in FIG. 8A to FIG. 8D has a shape which is turned laterally in a clockwise direction into alphabet "E".

Figure 8A:
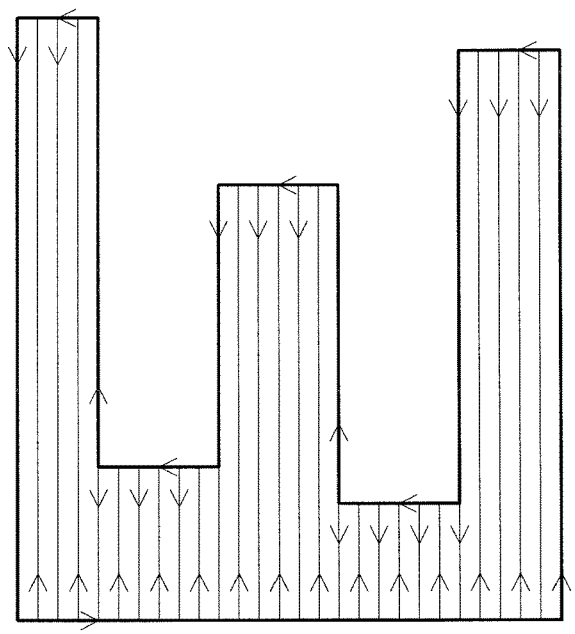
FIG. 8A to FIG. 8D are plan views illustrating various types of irradiation manners of a laser beam to slice data.

FIG. 8A is an example in which a laser beam is basically moved in a vertical direction with respect to the slice data. On the other hand, a laser beam is moved in a lateral direction on upper and lower boundaries of the slice data and then turned back. Thus, a laser beam can be moved without turning off halfway on the entire region of the slice data.

Figure 8B:
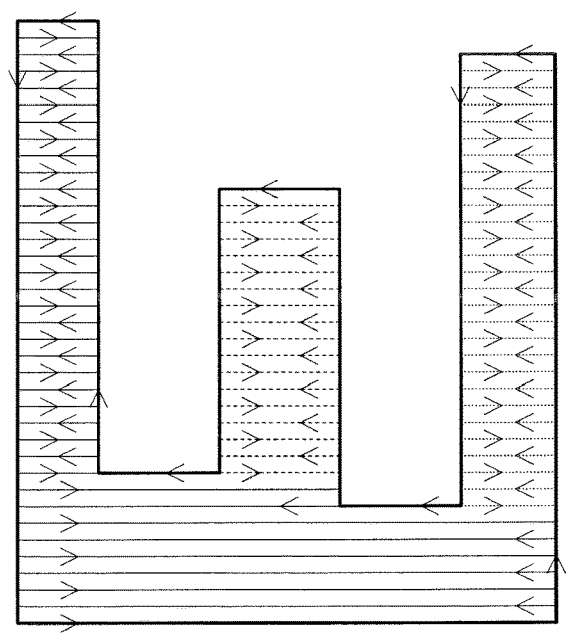

FIG. 8B is an example in which a laser beam is basically moved in a lateral direction. On the other hand, a laser beam is moved in a vertical direction on right and left boundaries of the slice data and then turned back.

Regarding three columnar partial regions, the irradiation manners of a laser beam are illustrated with solid lines, long dotted lines and short dotted lines. After irradiation to one columnar partial region is over, the laser beam is turned off and then moved to another columnar partial region, and after that, a laser beam is turned on again to perform irradiation.

For example, out of three columnar partial regions, first, on the columnar partial region at the right end a laser beam is moved in a lateral direction and moved from top to bottom while turning back. Next, on the columnar partial region in the center a laser beam is moved from bottom to top. Next, on the columnar partial region at the left end a laser beam is moved from top to bottom. Such movement of the laser beam in each columnar partial region is performed in order to move a laser beam between those columnar partial regions in the shortest amount of time.

Regarding a laterally continuous partial region to which the three columnar partial regions are connected, subsequently from irradiation to the columnar partial region at the left end, a laser beam is irradiated continuously without turning off halfway, for example.

Figure 8C:
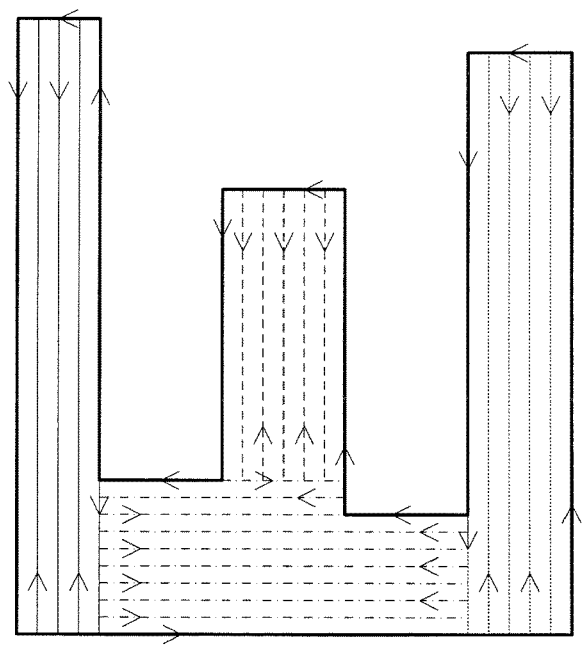

In FIG. 8C, a movement of a laser beam in a vertical direction and a movement of a laser beam in a lateral direction are used in combination. In this case, on the columnar partial region at the left end and a portion of the laterally continuous partial region to which the columnar partial region at the left end is connected, and on the columnar partial region at the right end and a portion of the laterally continuous partial region to which the columnar partial region at the right end is connected, a laser beam is moved in a vertical direction (illustrated with solid lines and short dotted lines). Also, on the columnar partial region in the center, a laser beam is moved in a vertical direction (illustrated with long dotted lines) in conformity to the left shorter boundary line. On a remaining portion of the laterally continuous partial region, a laser beam is moved in a lateral direction in a turned-on state subsequently after irradiation to the columnar partial region in the center is over. During the movement, a laser beam is continuously irradiated without turning off halfway.

Figure 8D:
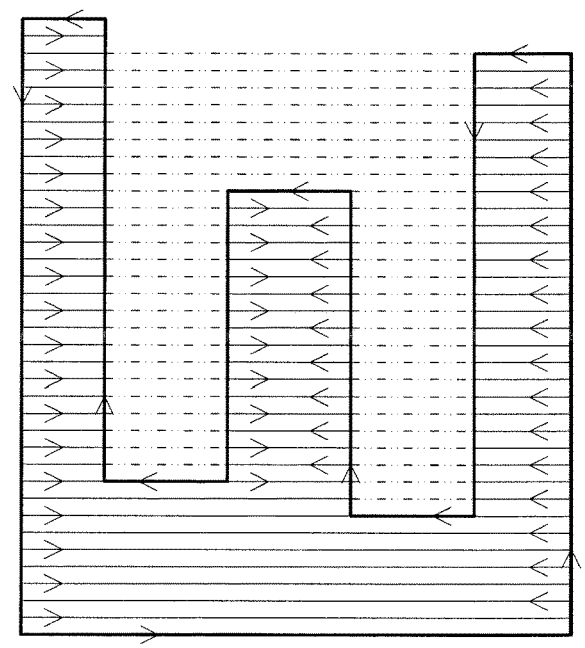

In FIG. 8D, a laser beam is moved in a lateral direction in the same manner as FIG. 8B. On the other hand, there are 1 or more other columnar partial regions on extension in a moving direction in which a laser beam is moved on one columnar partial region. On this occasion, unlike FIG. 8B, a laser beam is turned off and subsequently moved on a non-irradiation region of a laser beam on extension in the moving direction. Then, after reaching another partial region, a laser beam is turned on again to irradiate another columnar partial region.

First Example of the Control Method

FIG. 4A to FIG. 4F are plan views illustrating a first example of a control method using the powder bed fusion apparatus of FIG. 1 and FIG. 2.

Before starting the control of fusion by the control section 103, a plurality of divided regions illustrated in the first division mode of FIG. 3 are set, and stored into the memory 104.

For this purpose, first, distances from the center of the top surface of the thin layer forming container 11 to the boundaries of the temperature-stabilized regions, which correspond to elapsed times by the one second, for example, are investigated in advance by preliminary investigation.

Then, an image of the top surface of the thin layer forming container 11 and an X-Y coordinate having the center C of the top surface of the thin layer forming container 11 as an origin are displayed in an overlapped manner on a monitor 105 connected to the control section 103. Then, positions on X-axis or Y-axis, which correspond to the plurality of previously investigated distances, are touched by a touch pen. Consequently, by the control section 103, a plurality of circles having the distances as a radius are calculated, and furthermore squares inscribed on respective circles are calculated. Respective squares correspond to a plurality of divided regions corresponding to elapsed times, which are illustrated in the first division mode of FIG. 3. The positions of the boundaries of respective divided regions $B_0$ to $B_6$ set in this manner are stored in the memory 104.

Alternatively, distances from the center C of the top surface of the thin layer forming container 11 to the boundaries of the temperature-stabilized regions, which correspond to elapsed times by the one second, for example, may be input by a keyboard 106. This case also takes the process as described above, so that a plurality of divided regions corresponding to elapsed times are set, and the positions of the boundaries of respective divided regions $B_0$ to $B_6$ are stored into the memory 104.

Figure 4A:
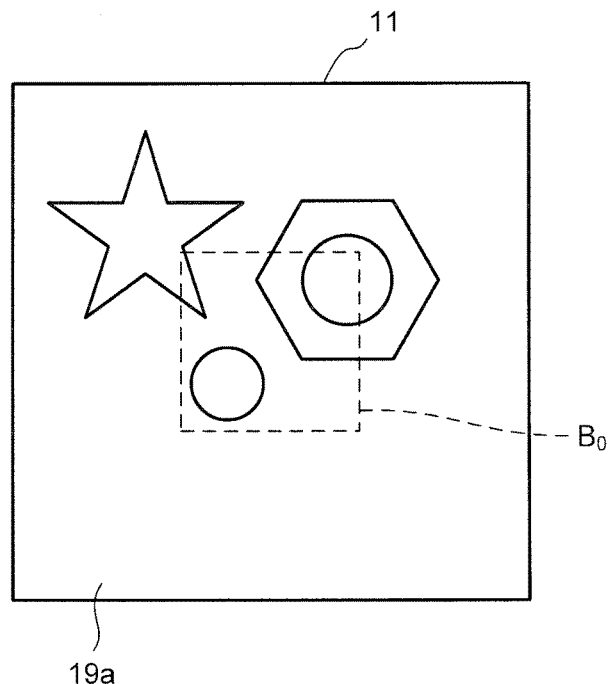
FIG. 4A to FIG. 4F are plan views illustrating a first example in which the first division mode of FIG. 3 is applied to the powder bed fusion method.

The slice data is previously stored into the memory 104. As illustrated in FIG. 4A, data for fabricating three models of a star-shaped post, a nut and a column (or circular cylinder) at once is set. The column, the star-shaped post and the nut are arranged at a central part, an obliquely left upper position and an obliquely right upper position, respectively.

Irradiation of a laser beam is set to be performed only to a model whose entire plane shape comes to be included within the temperature-stabilized region out of the three models according to the lapse of time.

After the data are stored, the control of fusion is performed by the control section 103 as follows.

First, the thin layer 19a of the powder material is formed. Immediately after the formation of the thin layer 19a (at 0 second), as illustrated in FIG. 4A, the entire slice data regarding the column is included within the temperature-stabilized region (corresponding to the inner region of boundary $B_0$).

Figure 4B:
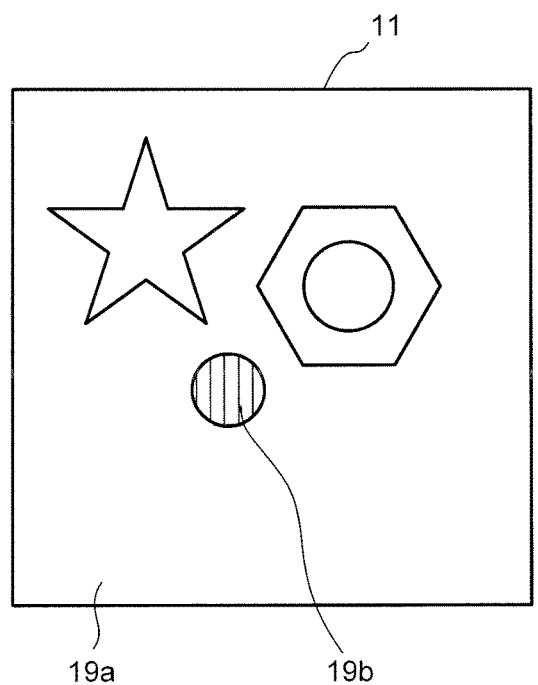

Therefore, as illustrated in FIG. 4B, a laser beam is moved in vertical direction while being irradiated from a left end of a circular region. As a laser beam reaches a lower boundary from an upper boundary of the circular region, a laser beam is then moved to the right on the lower boundary, and folded back to move from the lower boundary to the upper boundary while irradiating the thin layer 19a with a laser beam. This operation is sequentially repeated to melt and solidify the thin layer 19a across the entire circular region. Finally, a laser beam is moved along a circular outline to melt and solidify the thin layer 19a.

Figure 4C:
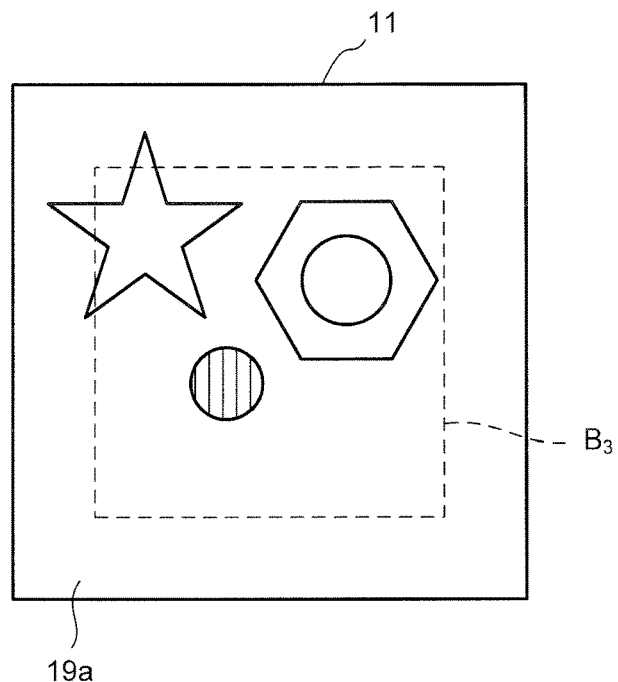

During this action, assuming that 3 seconds are taken from immediately after the formation of the thin layer 19, then, as illustrated in FIG. 4C, the temperature-stabilized region spreads, and thus the entire slice data regarding the nut comes to be included within the temperature-stabilized region (corresponding to the inner region of boundary $B_3$).

Figure 4D:
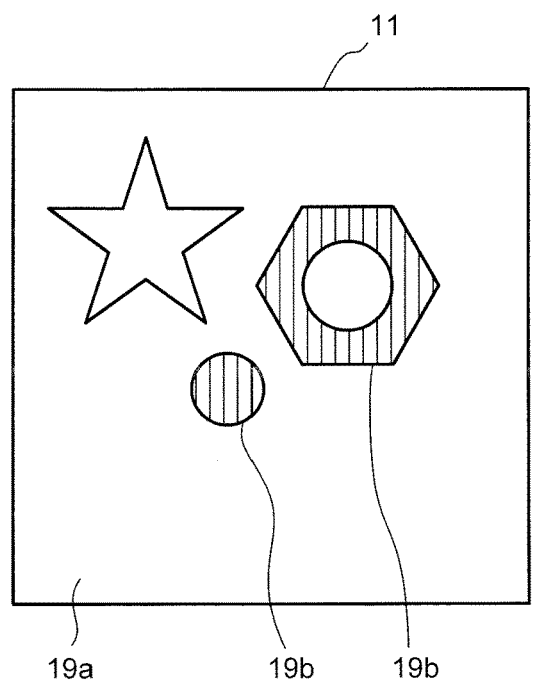

Then, as illustrated in FIG. 4D, a laser beam is moved in a vertical direction from a left end of a plane shape of the nut. Then, the laser beam is irradiated across the entire region of the plane shape of the nut while being turned back on the boundary to melt and solidify the thin layer 19a.

Figure 4E:
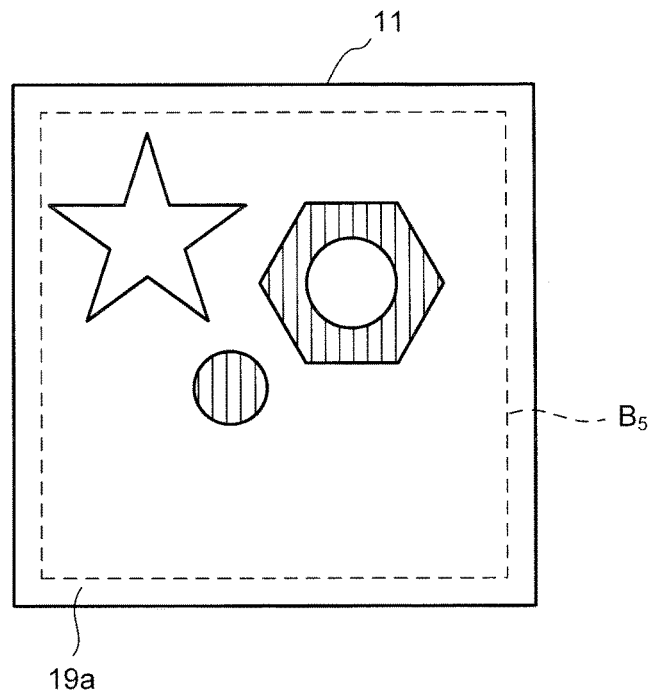

Furthermore, time elapses during this action. Assuming that 5 seconds elapses from immediately after the formation of the thin layer 19a, then, as illustrated in FIG. 4E, the entire slice data regarding a star-shaped post comes to be included within the temperature-stabilized region (corresponding to the inner region of boundary $B_5$).

Figure 4F:
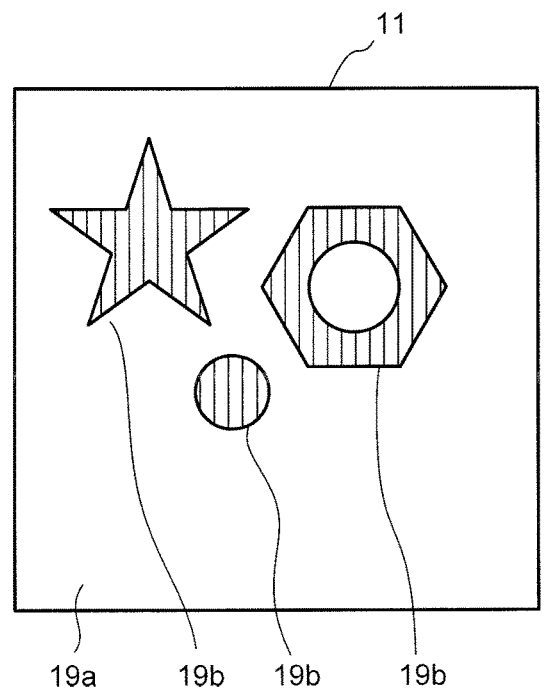

So, as illustrated in FIG. 4F, a laser beam is moved in vertical directions from a left end of the star shape. Then, the laser beam is irradiated across the entire region of the star shape while being turned back on the boundary of the star shape to melt and solidify the thin layer 19a.

In the above, since the plane shape of the nut and the star shape is not simple unlike a circle, an irradiation manner of a laser beam is not specifically explained for the plane shape of the nut or the star shape, but various irradiation manners of a laser beam can be applied according to FIG. 8A to FIG.

8D. According to the control method, the entire slice data which comes to be included within the temperature-stabilized region is irradiated at once. Therefore, irradiation of a laser beam can be performed according to the same manner as a manner which is normally performed to similar shape out of the above-described irradiation manners of a laser beam. By doing so, effect of shortening time can be checked in comparison manner.

Second Example of the Control Method

Next, referring to FIG. 5A to FIG. 5E, a control method for performing fusion regarding the slice data of another shape based on the first division mode of FIG. 3 will be explained.

FIG. 5A to FIG. 5E are plan views illustrating a second example of the control method using the powder bed fusion apparatus of FIG. 1 and FIG. 2.

The slice data is previously stored in the memory 104 similarly to the first example.

Figure 5A:
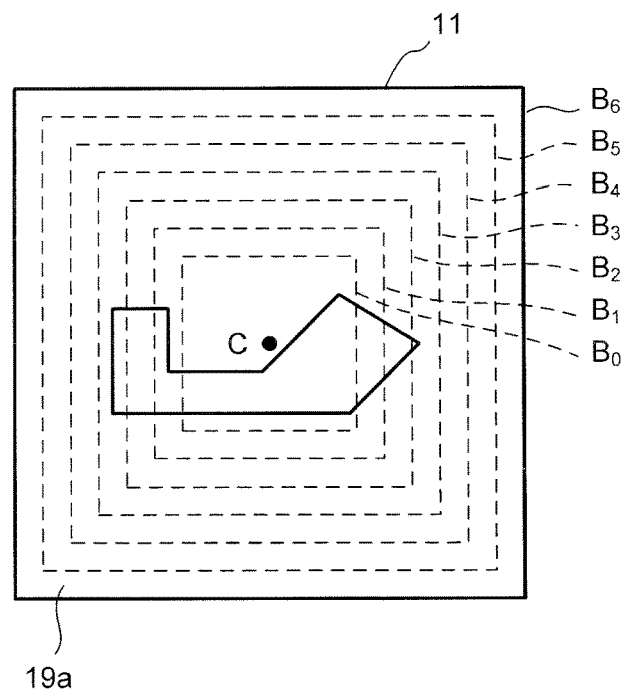
FIG. 5A to FIG. 5E are plan views illustrating a second example in which the first division mode of FIG. 3 is applied to the powder bed fusion method.

The slice data is for fabricating one model. As illustrated in FIG. 5A, the slice data has a key-like shape, and is arranged horizontally. And the slice data has a size in which even if the slice data is arranged in any manner, only a portion of the entire shape is included within the temperature-stabilized region (corresponding to the inner region of boundary $B_0$) immediately after the formation of the thin layer 19a.

On the other hand, regarding the portion within the temperature-stabilized region, an upper boundary and a lower boundary of the slice data are included within the temperature-stabilized region. Therefore, in case that a laser beam is moved in a vertical direction, the temperature-stabilized region is not discontinuous along the moving line of a laser beam from one boundary to another boundary.

If the temperature-stabilized region ends halfway along the moving line from one boundary to another boundary of the slice data, it is necessary for a laser beam to be turned back at the ending portion. Commonly, the moving speed of a laser beam needs to be decelerated immediately before turning back. Therefore, extra time is taken in case that there is a need of turning back at a position which is not a boundary. For this reason, in some cases, it is desirable that the slice data be appropriately arranged, or an irradiation manner of a laser beam is devised according to FIG. 8A to FIG. 8D to avoid turning back at the position which is not a boundary.

In this second example as well, divided regions are stored into the memory 104 similarly to the first example before starting the control of fusion by the control section 103.

After the data is stored, the control of fusion is performed by the control section 103 as follows.

Figure 5B:
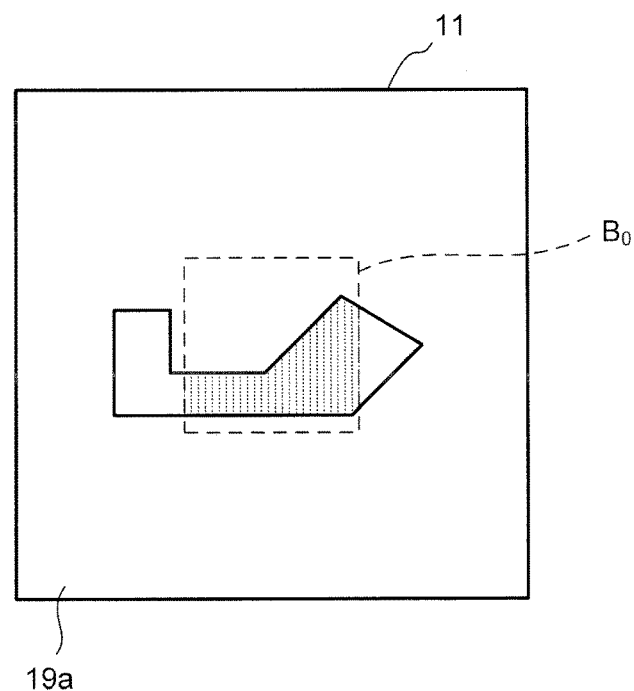

First, the thin layer 19a is formed. Immediately after that (at 0 second), as illustrated in FIG. 5B, a laser beam is moved in a vertical direction with respect to the thin layer 19a of a partial region of the slice data which is included within the temperature-stabilized region (corresponding to the inner region boundary $B_0$), and irradiated while being turned back on the boundary of the slice data to melt and solidify the thin layer 19a. Note that short dotted lines denote irradiation of a laser beam which is performed most recently. The same is applied below.

Figure 5C:
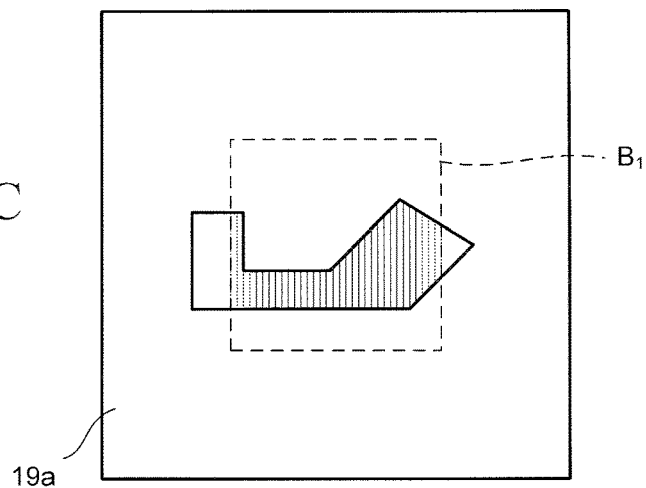

During this action, assuming that 1 second is taken from immediately after the formation of the thin layer 19a, as illustrated in FIG. 5C, a laser beam is moved in a vertical direction with respect to the thin layer 19a of a partial region of the slice data, which comes to be newly included within the enlarged temperature-stabilized region (corresponding to the inner region of boundary $B_1$), and irradiated while being turned back on the boundary to melt and solidify the thin layer 19a. Note that solid lines denote irradiation of a laser beam which is already performed before. The same is applied below.

Figure 5D:
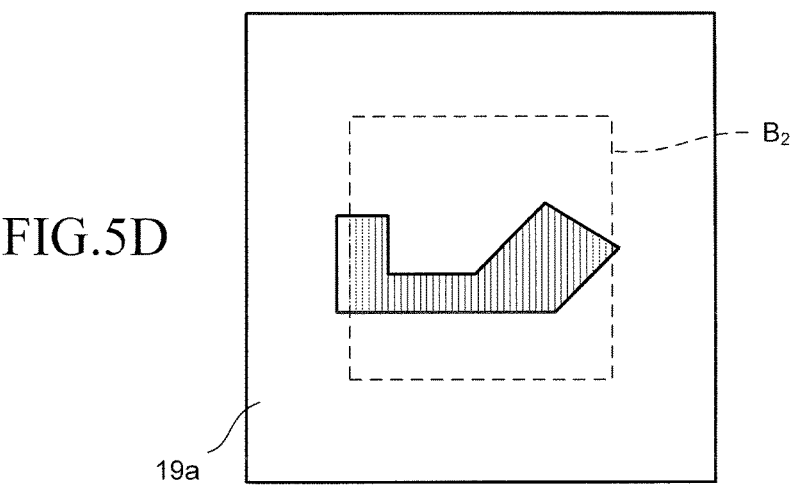

During this action, time elapses. Then, assuming that 2 seconds elapse from immediately after the formation of the thin layer 19a, as illustrated in FIG. 5D, a laser beam is moved in vertical direction with respect to the thin layer 19a of a partial region of the slice data, which comes to be newly included within the further enlarged temperature-stabilized region (corresponding to the inner region of boundary $B_2$), and irradiated while being turned back on the boundary to melt and solidify the thin layer 19a.

Figure 5E:
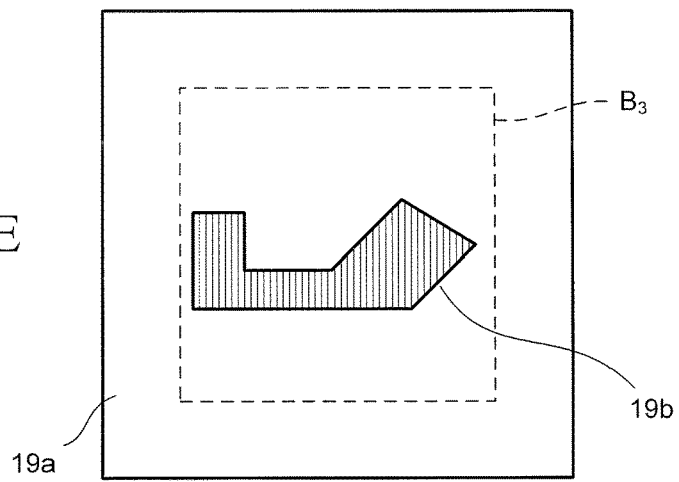

Furthermore, during this action, assuming that 3 seconds or more elapse from immediately after the formation of the thin layer 19a, as illustrated in FIG. 5E, the entire shape of the slice data comes to be included within the temperature-stabilized region (corresponding to the inner region of boundary $B_3$).

So, as illustrated in FIG. 5E, a laser beam is moved in a vertical direction with respect to the thin layer 19a of a partial region of the slice data, which newly comes to be included within the further enlarged temperature-stabilized region, and irradiated while being turned back on the boundary to melt and solidify the thin layer 19a.

Then, finally, a laser beam is moved along an outline of the shape of the slice data and the thin layer 19a is irradiated with the laser beam to melt and solidify the thin layer 19a.

Consequently, the subsequently solidified layer 19b is formed across the entire region of the shape of the slice data.

Third Example of the Control Method

Figure 6A:
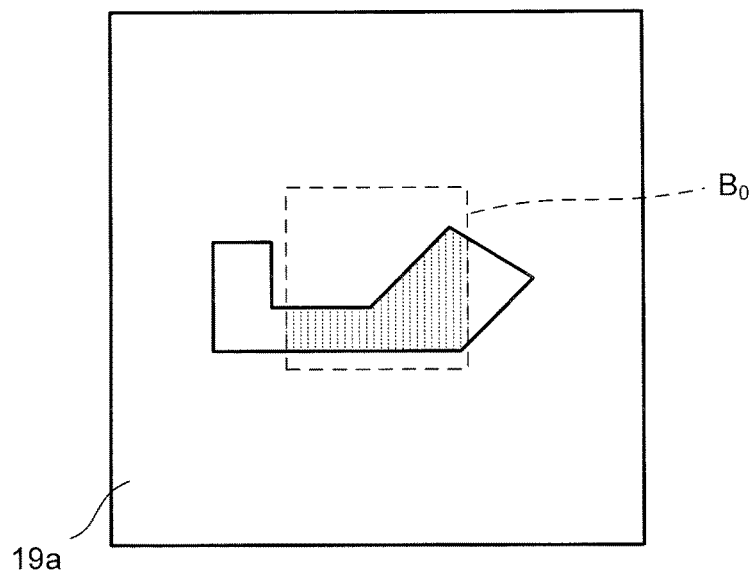
FIG. 6A and FIG. 6B are plan views illustrating a third example in which the first division mode of FIG. 3 is applied to the powder bed fusion method.
Figure 6B:
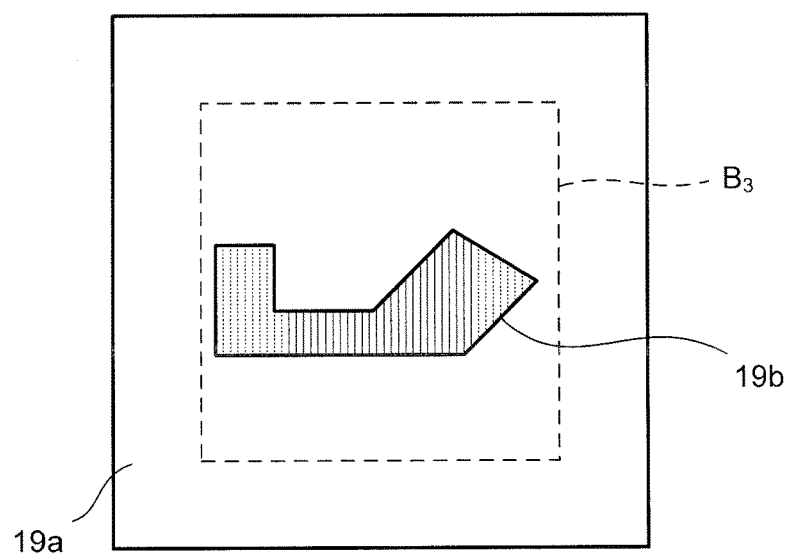

FIG. 6A, FIG. 6B are plan views illustrating a third example of a control method being a modified example of the second example.

The third example is the control method for performing powder bed fusion based on the first division mode of FIG. 3 regarding the same slice data as the second example.

In the second example, 1 second is taken until first fusion is over from immediately after the formation of the thin layer as illustrated in FIG. 5B. In contrast, in the third example, it is assumed that a longer time of 3 seconds or more is taken until first fusion is over from immediately after the formation of the thin layer as illustrated in FIG. 6A.

In such case, as illustrated in FIG. 6B, when first irradiation of a laser beam is over, the entire shape of the slice data comes to be already included within the temperature-stabilized region (corresponding to the inner region of boundary $B_3$).

Then, the thin layer 19a of the entire remaining region of the slice data is irradiated with a laser beam at once. In this case, the thin layer 19a of the entire remaining region can be irradiated with the laser beam from anywhere. Thus, it is better to start irradiation of the laser beam subsequently from the vicinity of a position which is finally irradiated with the laser beam.

Consequently, the subsequently solidified layer 19b is formed across the entire region of the shape of the slice data.

(b) Second Division Mode and a Control Method Based on the Second Division Mode (Second Division Mode)

Next, referring to FIG. 7A and FIG. 7B, a second division mode in which divided regions are set on the thin layer 19a of the powder material in the thin layer forming container 11 will be explained.

Figure 7A:
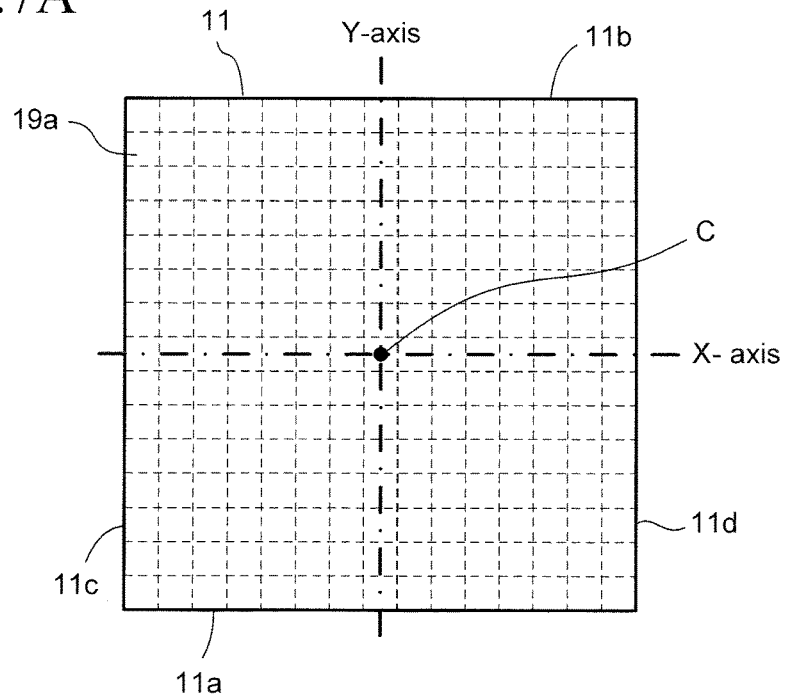
FIG. 7A and FIG. 7B are plan views illustrating a setting manner of a second division mode for a surface of the thin layer of the powder material according to the first embodiment of the present invention.

FIG. 7A is a plan view illustrating a unit region of division.

Figure 7B:
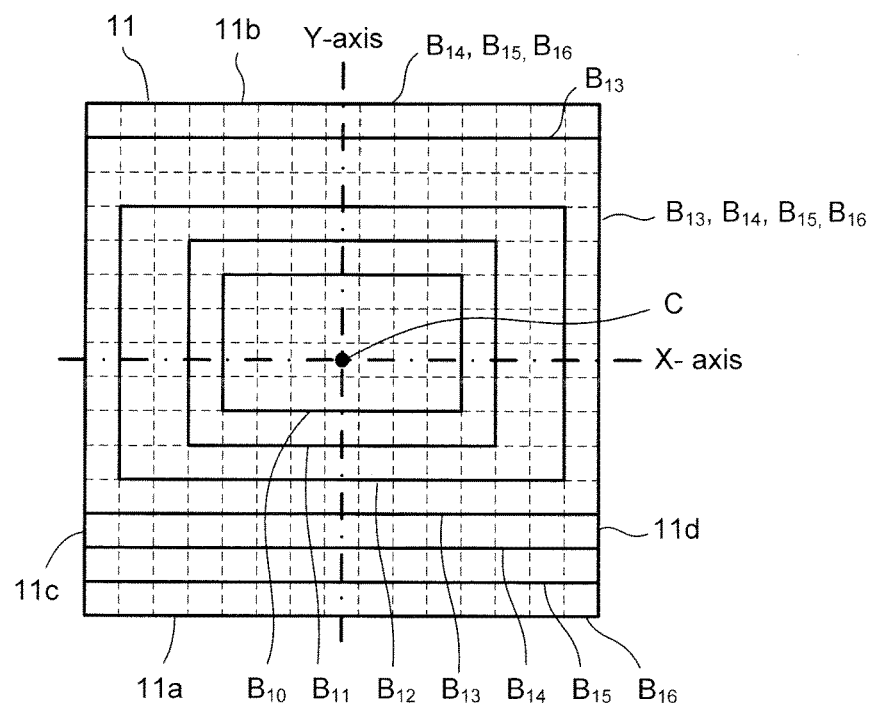

FIG. 7B is a plan view illustrating an example in which divided regions are set based on unit region according to temporal changes of temperature distribution.

X-axis and Y-axis passing through the center C of a top surface region inside the thin layer forming container 11 are set. At this point, an intersection of X-axis and Y-axis, that is, an origin of an X-Y coordinate system matches the center C of the top surface region inside the thin layer forming container 11.

Furthermore, a unit region of division is arranged such that the intersection of X-axis and Y-axis coincides with the center of a unit region of division at the central part.

For example, as illustrated by dotted lines of FIG. 7A, a horizontal side and a vertical side of the top surface region inside the thin layer forming container 11 are severally divided into 14 in a grating state, and 15 unit regions of division are set horizontally and vertically, respectively. The unit region of division is a square region surrounded by dotted lines.

Accordingly, the position of each unit region of division can be specified by a central coordinate of each unit region on the X-Y coordinate system.

Next, based on the unit region of division, setting manners of a divided region according to temporal changes of temperature distribution will be explained by a first example and a second example.

The first example of the setting manners is a case where the temperature-stabilized region isotropically spreads over time. In this case, the boundary of a divided region is set similar to FIG. 3, and an inner region of the boundary is regarded as the temperature-stabilized region.

In this case, the layer may be divided such that the boundary of the divided region matches the boundary of the unit region.

The second example of the setting manners is a case where a front area (a lower portion in FIG. 7B) of the thin layer forming container 11 is easily cooled down. In this case, as illustrated in FIG. 7B, boundaries of a plurality of divided regions corresponding to elapsed times are set such that a spreading manner of the temperature-stabilized region becomes slow in a front area, and becomes fast in side areas and a rear area. Inner regions of the boundaries are regarded as the temperature-stabilized regions.

In FIG. 7B, the boundary of each divided region is illustrated by thick solid lines expressed in reference marks $B_{10}$ to $B_{16}$. The innermost boundary $B_{10}$ denotes the boundary of the temperature-stabilized region immediately after the formation of the thin layer 19a of the powder material. The boundaries $B_{11}$ to $B_{16}$ outside the boundary $B_{10}$ denote boundaries of the temperature-stabilized regions spreading with the lapse of time from immediately after the formation of the thin layer 19a. Herein, respective subscript figures of the boundaries $B_{11}$ to $B_{16}$ denote that as each of the subscript figures becomes larger, time gradually elapses from immediately after the formation of the thin layer 19a.

In the above-described second division mode, the position of the unit region of division can be identified by the central coordinate of the unit region, so that the boundary of each divided region $B_{10}$ to $B_{16}$ can be identified on the coordinate as well.

Therefore, by allowing the boundary of each divided region $B_{10}$ to $B_{16}$ and elapsed time to correspond to each other and overlapping the slice data on the same coordinate, it becomes possible to identify when and which portion of the shape of the slice data comes to be included within the temperature-stabilized region.

The second division mode is useful in order to set divided regions particularly in the case where the spreading manner of the temperature-stabilized region is not isotropic as in the second example.

(Control Method Based on the Second Division Mode)

To perform the powder bed fusion method based on the second division mode, a control method similar to FIG. 4 to FIG. 6 can be applied.

In this case as well, before starting the control of fusion by the control section 103, the boundaries of the divided regions $B_{10}$ to $B_{16}$ are stored into the memory 104 similarly to the control method based on the first division mode.

At that time, there is a case where the divided regions are not in a symmetric shape with the origin of the X-Y coordinate as a center. In such case, the storing is easier when the monitor (image display device) 105 is used.

For example, the storing is performed by displaying the unit regions of division and the X-Y coordinate on the monitor 105 in an overlapped manner, and sequentially touching unit regions included within the temperature-stabilized region at elapsed time by the one second by the touch pen.

Alternatively, the storing can be also performed by sequentially drawing a range by the touch pen so as to surround all unit regions included within the temperature-stabilized region at elapsed time by the one second.

Note that the storing manner of divided regions into the memory 104 is not limited to the aforementioned manners, but the storing can be performed in various manners.

As described above, according to the first embodiment of the present invention, a plurality of divided regions are set at the inner top surface of the thin layer forming container 11, and each divided region corresponds to the temperature-stabilized region spreading with time from immediately after the formation of the thin layer 19a. With this, according to the elapsed time the corresponding divided region can be identified, and furthermore a partial region of the slice data which comes to be included within the divided region can be identified.

Therefore, the thin layer 19a of a partial region of the slice data, which is already included within the temperature-stabilized region immediately after the formation of the thin layer 19a, can be irradiated with a laser beam instantly from immediately after the formation of the thin layer 19a without any interval. Then, the temperature-stabilized region further spreads during the irradiation, and thus a new partial region of the slice data comes to be included within the region. Accordingly, the thin layer 19a of the partial region can be subsequently irradiated with a laser beam.

Thus, no wait time for irradiation of a laser beam is required, and therefore, time required for modeling can be shortened.

Note that time of irradiating a laser beam immediately after the formation of the thin layer 19a is relatively long, so that during the irradiation the entire thin layer 19a comes often to be included in the temperature-stabilized region. In such case, only identifying a divided region immediately after the formation of the thin layer is enough. After the thin layer 19a in the divided region is irradiated with a laser beam, the thin layer 19a of a remaining region of the slice data can be irradiated with a laser beam from anywhere.

For a further simplified case, possibly, without setting a certain divided region, a laser beam can be irradiated sequentially from the central region of the thin layer 19a to a peripheral region thereof according to the slice data.

(2) Powder Bed Fusion Method According to the Embodiment

A powder bed fusion method according to the embodiment will be explained referring to FIG. 9A to FIG. 9N.

Figure 9A:
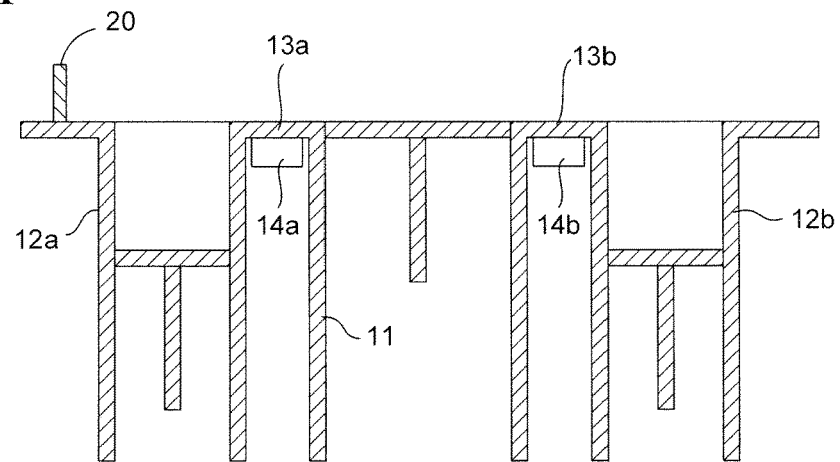
FIG. 9A to FIG. 9N are cross-sectional views illustrating the powder bed fusion method according to the first embodiment of the present invention.
Figure 9B:
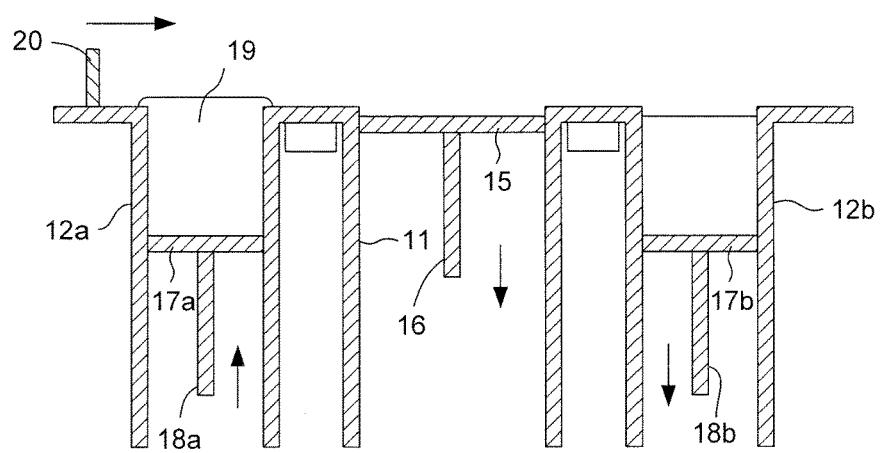
Figure 9C:
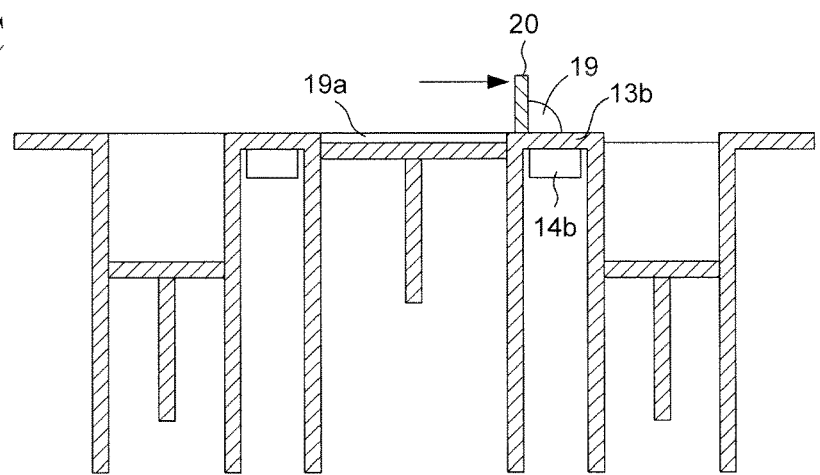
Figure 9D:
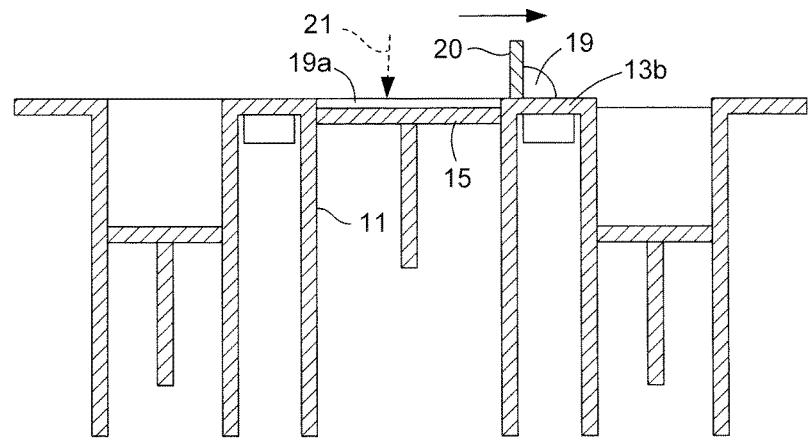
Figure 9E:
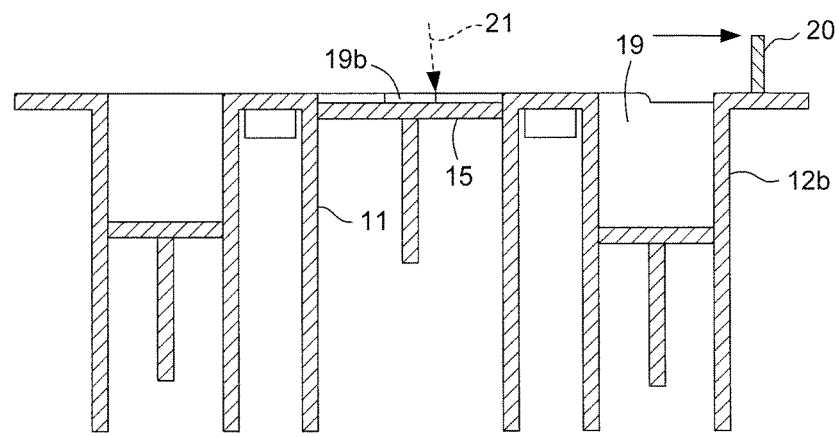
Figure 9F:
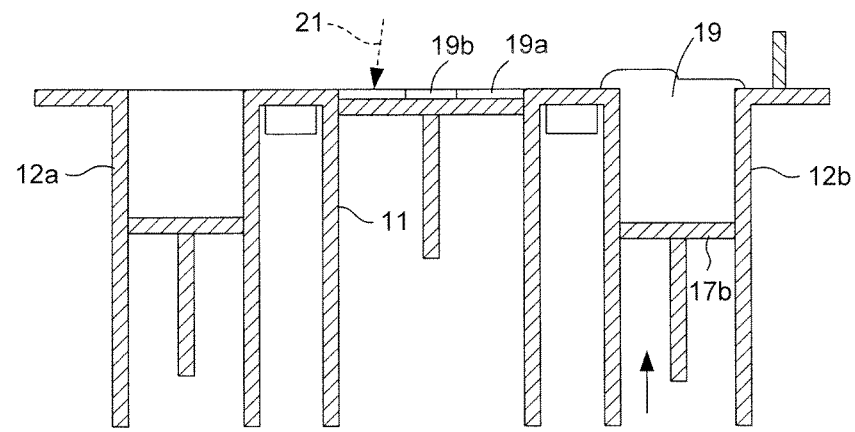
Figure 9G:
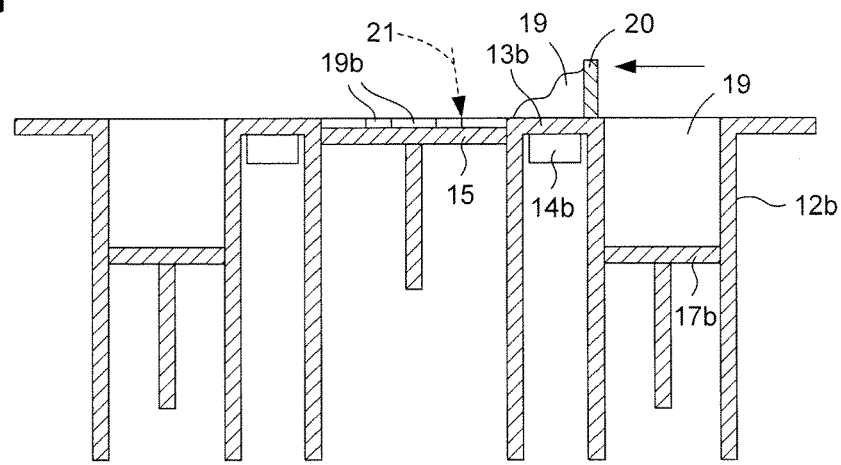
Figure 9H:
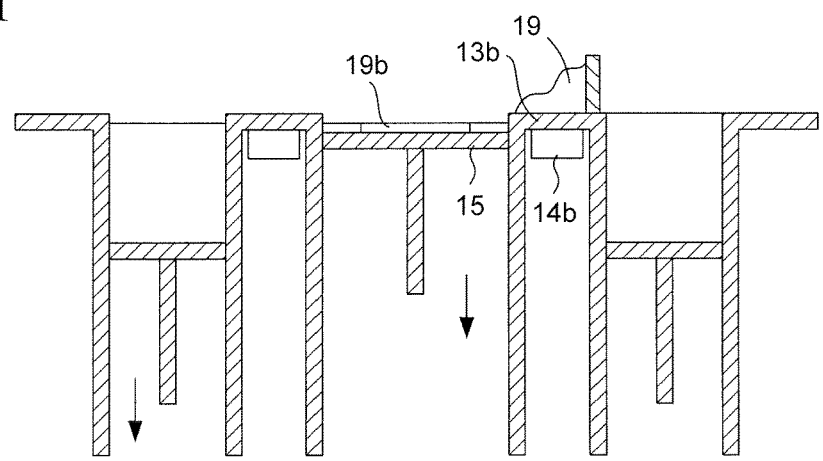
Figure 9I:
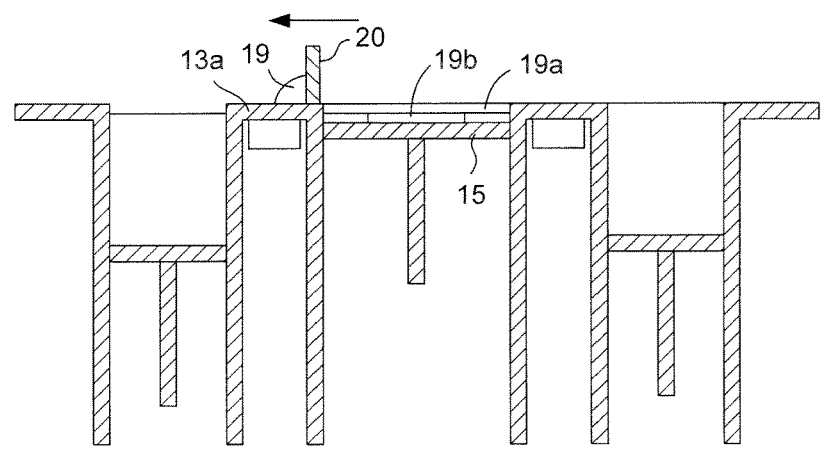
Figure 9J:
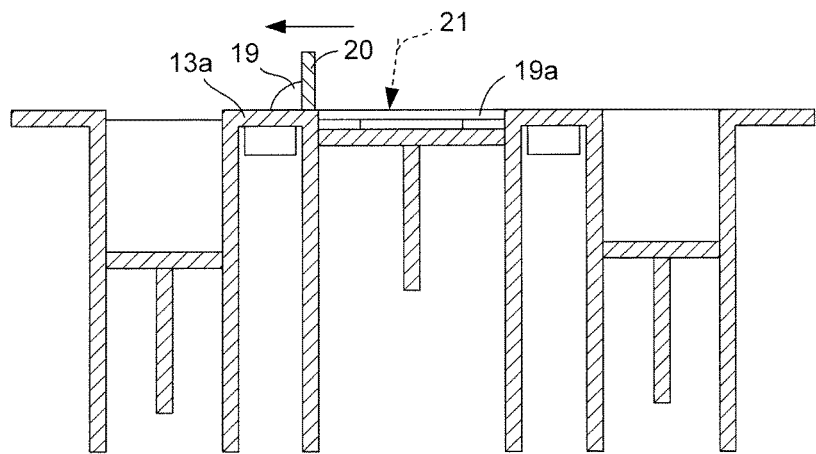
Figure 9K:
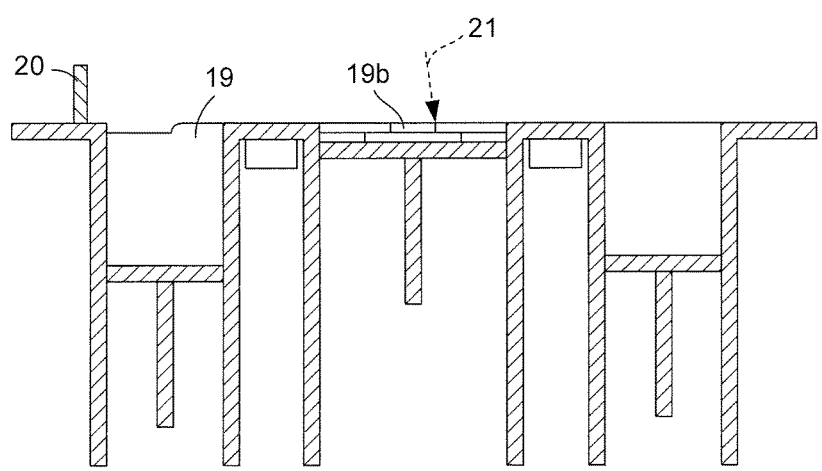
Figure 9L:
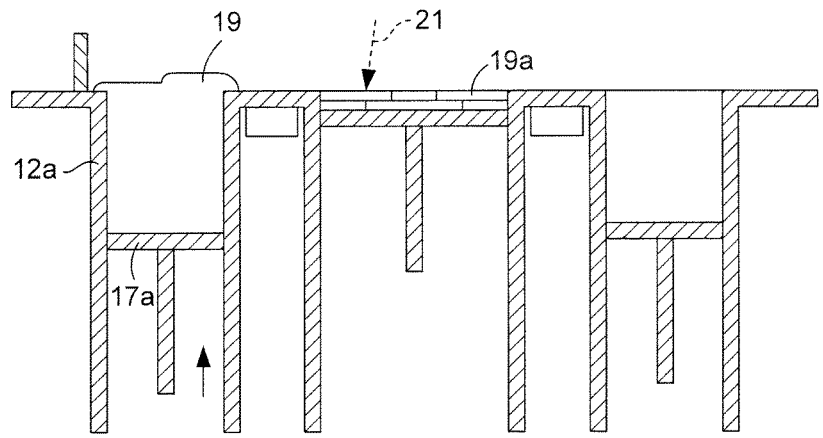
Figure 9M:
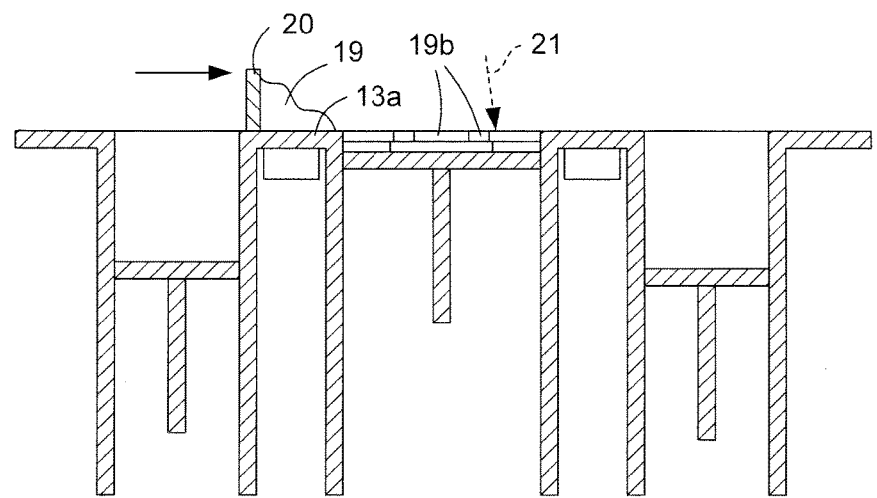
Figure 9N:
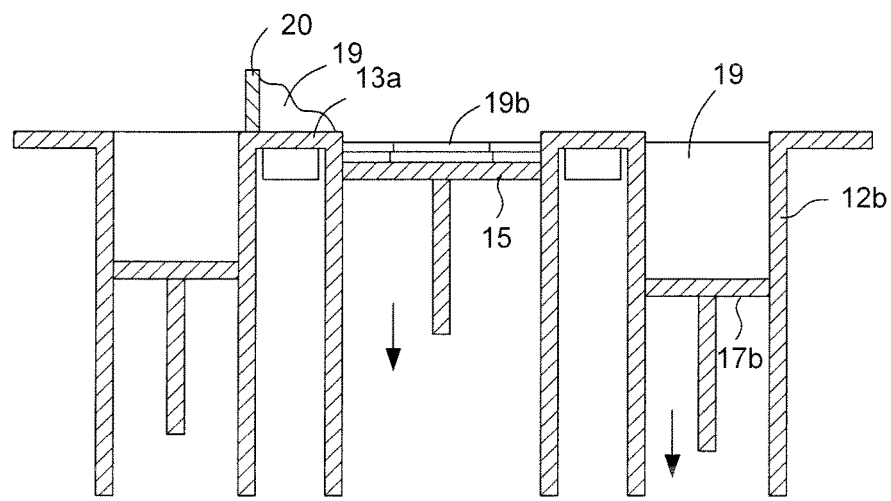

FIG. 9A to FIG. 9N are cross-sectional views illustrating various aspects of a powder bed fusion apparatus operated by the control of the control section 103. Fusion is performed by the control method illustrated in FIG. 4A to FIG. 4F.

In the powder bed fusion method of FIG. 9A to FIG. 9N, a laser beam can be irradiated without an interval immediately after the formation of the thin layer 19a of the powder material as illustrated in FIG. 9C, so that it is possible to proceed with a work by the recoater 20 in FIG. 9D to FIG. 9G concurrently during irradiation of a laser beam.

The control section 103, before starting modeling, previously activates the heaters 14a and 14b to heat the top surfaces of right and left flanges 13a and 13b to temperature a little lower than the melting temperature. Furthermore, another heating means are activated and set in advance so that the powder materials 19 in the containers 11, 12a, 12b are in a stabilized state at temperature a little lower than the melting temperature and higher than the lower limit temperature for starting a laser beam irradiation.

The lower limit temperature for starting laser beam irradiation is a temperature lower than the melting temperature by 50° C. in the case of resin powder, for example.

On the other hand, the case of the metal powder is also in conformity with the case of resin powder. In the case of metal, the melting temperature is considerably higher than that of resin, and therefore, a wider range is better for the lower limit temperature in contrast to that lower than the melting temperature by 50° C. in the case of resin.

First, as illustrated in FIG. 9A, the recoater 20 is put at an outer rim portion of the first powder material housing container 12a.

Next, as illustrated in FIG. 9B, the first feed table 17a mounting the powder material 19 thereon is elevated to project the powder material 19 from the first powder material housing container 12a, and the part table 15 is lowered by an amount of one layer of the thin layer 19a. Further, the second feed table 17b is lowered to a level where a powder material residual after forming the thin layer 19a is sufficiently housed.

Next, as illustrated in FIG. 9C, the recoater 20 is moved to the right to push forward and take off the powder material 19 projected from the first powder material housing container 12a and carry the powder material 19 to the thin layer forming container 11. Then, the powder material 19 is carried into the thin layer forming container 11 while its surface is leveled by the recoater 20 to form the thin layer 19a of the powder material on the part table 15. Furthermore, the recoater 20 is moved to the right in order to carry the residual powder material 19 to the second powder material housing container 12b.

At this point, as illustrated in FIG. 9D, irradiation of the laser beam 21 to the thin layer 19a of the powder material is started instantly after the recoater 20 reaches onto the right flange 13.

The divided regions are sequentially irradiated with the laser beam 21 based on the slice data (drawing pattern) of a three-dimensional model to be fabricated and according to temporal changes of temperature distribution. Then, the following actions are performed during the irradiation of the laser beam 21.

Specifically, as illustrated in FIG. 9E, the recoater 20 is further moved to the right to carry the residual powder material 19 to the second powder material housing container 12b, and house the material on the second feed table 17b.

Next, as illustrated in FIG. 9F, the second feed table 17b mounting the powder material 19 thereon is elevated to project the powder material 19 from the top surface of the second powder material housing container 12b.

Next, as illustrated in FIG. 9G, the recoater 20 is moved to the left to push forward and take off the powder material 19 projected from the second powder material housing container 12b. Subsequently, in order to carry the powder material 19 to the thin layer forming container 11, the recoater 20 is moved further to the left. Then, in the case where irradiation of the laser beam 21 is not finished yet when the recoater 20 reached onto the right flange 13b, the recoater 20 is made to wait on the right flange 13b. During the waiting, the powder material 19 on the right flange 13b is heated by the heater 14b, and maintained at temperature a little lower than the melting temperature. The same is applied below.

Next, as illustrated in FIG. 9H, after irradiation of the laser beam 21 is over, the part table 15 is lowered by an amount of one layer of the thin layer 19a, and the first feed table 17a is lowered. Note that the first feed table 17a may be lowered during the irradiation of the laser beam 21.

Next, as illustrated in FIG. 9I, the recoater 20 is moved to the left to form the thin layer 19a of the powder material as the second layer on the subsequently solidified layer 19b as the first layer, and after the recoater 20 reached onto the left flange 13a, irradiation of the laser beam 21 is instantly started as illustrated in FIG. 9J.

The divided regions are sequentially irradiated with the laser beam 21 based on the slice data of three-dimensional model to be fabricated and according to temporal changes of temperature distribution. Then, the above-described action is performed during the irradiation of the laser beam 21.

Specifically, as illustrated in FIG. 9K, the recoater 20 is further moved to the left to carry the residual powder material 19 to the first powder material housing container 12a and house the material on the first feed table 17a.

Next, as illustrated in FIG. 9L, the first feed table 17a mounting the powder material 19 thereon is elevated to project the powder material 19 from the top surface of the first powder material housing container 12a.

Next, as illustrated in FIG. 9M, the recoater 20 is moved to the right to push forward and take off the powder material 19 projected from the first powder material housing container 12a. Subsequently, in order to carry the powder material 19 to the thin layer forming container 11, the recoater 20 is further moved to the right. Then, in the case where irradiation of the laser beam 21 is not finished yet when the recoater 20 reached onto the left flange 13b, the recoater 20 is made to wait on the left flange 13b. During the waiting, the powder material 19 on the left flange 13b is heated by the heater 14b, and maintained at temperature a little lower than the melting temperature. The same is applied below.

Next, as illustrated in FIG. 9N, after irradiation of the laser beam 21 is over, the part table 15 is lowered by an amount of one layer of the thin layer 19a, and the second feed table 17*b* is lowered. Note that the second feed table 17*b* may be lowered during the irradiation of the laser beam 21.

After that, processes illustrated in FIG. 9C to FIG. 9N are repeated to stack a required number of the subsequently solidified layers 19*b*. Thus, a three-dimensional model is fabricated.

According to the embodiment of the present invention explained above, partial regions of the thin layer 19*a*, which come to be included within the temperature-stabilized region one after another with the lapse of time from immediately after forming the thin layer 19*a* of the powder material, are sequentially irradiated with the laser beam 21 by the control of the control section 103. Consequently, the laser beam 21 can be irradiated instantly without waiting time from immediately after the formation of the thin layer 19*a*, and thus time required for modeling can be shortened.

Further, while the thin layer 19*a* is irradiated with the laser beam 21 after forming the thin layer 19*a*, the recoater 20 is moved to house a residual powder material on the feed table 17*b* or 17*a* on the housing side, and after that, the feed table 17*b* or 17*a* which newly becomes a feeding side is elevated to project the new powder material 19 from the top surface of the powder material housing container 12*b* or 12*a*, the recoater 20 is moved in an opposite direction to push forward and take off the projected powder material 19 and then carry the materials to the front of the thin layer forming container 11.

Then, the part table 15 is lowered without an interval immediately after irradiation of the laser beam 21 is over, the recoater 20 is moved to carry the new powder material 19 on the part table 15 and then form the new thin layer 19*a*, and subsequently the new thin layer 19*a* is irradiated with the laser beam 21.

As described above, according to the embodiment of the present invention, time (1 cycle) required for forming 1 layer of the subsequently solidified layer 19*b* includes only the lowering time of the part table 15, the moving time of the recoater 20 for forming the thin layer 19*a* on the part table 15, and the irradiation time of the laser beam 21. In other words, in forming 1 layer of the subsequently solidified layer 19*b*, time can be further shortened by an amount of time which is taken from immediately after forming the thin layer 19*a* on the part table 15 and until the new powder material 19 is carried to the front of the part table 15.

Thus, in a powder bed fusion method where there is a need for stacking the subsequently solidified layers 19*b* by several thousand layers to complete model, time required for modeling can be significantly shortened.

Furthermore, the temperature-stabilized regions in which a temperature difference from the melting temperature of the powder material is small are sequentially fused. With this, in the subsequently solidified layer 19*b* and eventually the completed model, thermal strain can be suppressed to a small level and thus warp can be prevented.

As described above, according to the embodiment of the present invention, time required for modeling can be significantly shortened, and thermal strain can be suppressed to a small level and thus warp can be prevented in the subsequently solidified layer 19*b* and eventually the completed model.

(3) Example

Next, an investigation result of time required for modeling based on the powder bed fusion method of FIG. 9A to FIG. 9N will be explained.

The investigation was performed using a powder bed fusion apparatus equipped with a modeling section 102 having the entire size at a breadth 1600 mm and a depth 750 mm. The modeling section 102 includes the thin layer forming container 11 having a breadth 560 mm and a depth 560 mm, the first and second powder housing containers 12*a*, 12*b* each having a breadth 340 mm and a depth 560 mm, and first and second flanges 14*a*, 14*b* each having a breadth 160 mm and a depth 600 mm.

Then, a region equivalent to approximately 30% of the entire area of the top surface of the thin layer 19*a* of the powder material in the thin layer forming container 11 was irradiated with the laser beam 21. According to the investigation, irradiation time (TL) of the laser beam 21 depended on the shape of a model, and changed from approximately 10 seconds to 60 seconds or more per one layer. So, an average irradiation time (TL) was set to 30 seconds.

Further, a moving speed of the recoater 20 was 200 mm/seconds at a constant speed.

In this case, calculated moving times of the recoater 20 on both the powder material housing containers 12*a* and 12*b* are 1.7 seconds, respectively. However, in movement including acceleration, acceleration is performed in gentle manner in order to avoid vibration of the recoater 20. On the other hand, in movement including deceleration, deceleration is performed in rapid manner because there is no need to avoid the vibration of the recoater 20. For this reason, moving time (T4) including deceleration was 1.5 seconds, moving time (T5) including acceleration was 3 seconds.

Further, on the flanges 13*a* and 13*b*, the moving time (T1, T3) is 0.8 second for both.

Further, the moving time (T2) on the thin layer forming container 11 is 2.8 seconds.

Further, time (Tpd) required for lowering the part table 15, time (Tfu) required for elevating feed tables 17*a*, 17*b*, and time (Tfd) required for lowering the feed tables 17*a*, 17*b* were approximately 0.5 second, respectively.

Now, time (T), which is taken from immediately after forming the thin layer 19*a* on the part table 15 and until the recoater 20 houses the residual powder material into the powder material housing container 12*a* or 12*b* and carries a new powder material from the powder material housing container 12*a* or 12*b* onto the flange 13*a* or 13*b*, is equal to time obtained by totalizing time (T3=0.8 second) in which the recoater 20 moves on the flange 13*a* or 13*b*, time (T4=1.5 seconds) in which the recoater moves on the powder material housing container 12*a* or 12*b* in a decelerating manner, time (Tfu=0.5 second) in which the feed table 17*a* or 17*b* is elevated, and time (T5=3 seconds) in which the recoater 20 move on the powder material housing container 12*a* or 12*b* again in an accelerating manner and reaches onto the flange 13*a* or 13*b*. Specifically, the time (T) is 5.8 seconds.

When the time (T) is compared with irradiation time (TL=30 seconds) of the laser beam 21, the irradiation time of the laser beam 21 is considerably longer. Therefore, while the laser beam 21 is irradiated, the above-described work can be performed in concurrently running manner so that the recoater 20 can house the residual powder material and carry the new powder material onto the flange 13*a* or 13*b*.

Therefore, in the powder bed fusion method of this embodiment, time required for 1 cycle is time obtained by totalizing time (Tpd=0.5 second) for lowering the part table 15, time (T1=0.8 second) in which the recoater 20 moves on the flange 13*a* or 13*b*, time (T2=2.8 seconds) in which the recoater 20 moves on the thin layer forming container 11, and irradiation time (TL=30 seconds) of a laser beam.

Specifically, the time per 1 cycle is 34.1 seconds. Here, time obtained by totalizing time (Tpd), time (T1) and time (T2) is time for forming the thin layer 19a on the part table 15.

Note that the time (Tfd) required for lowering the feed table 17a or 17b illustrated in FIG. 9H is not counted as a target time to be shortened because lowering of the feed table is also performed simultaneously in lowering the part table 15.

Comparative Example

Figure 13:
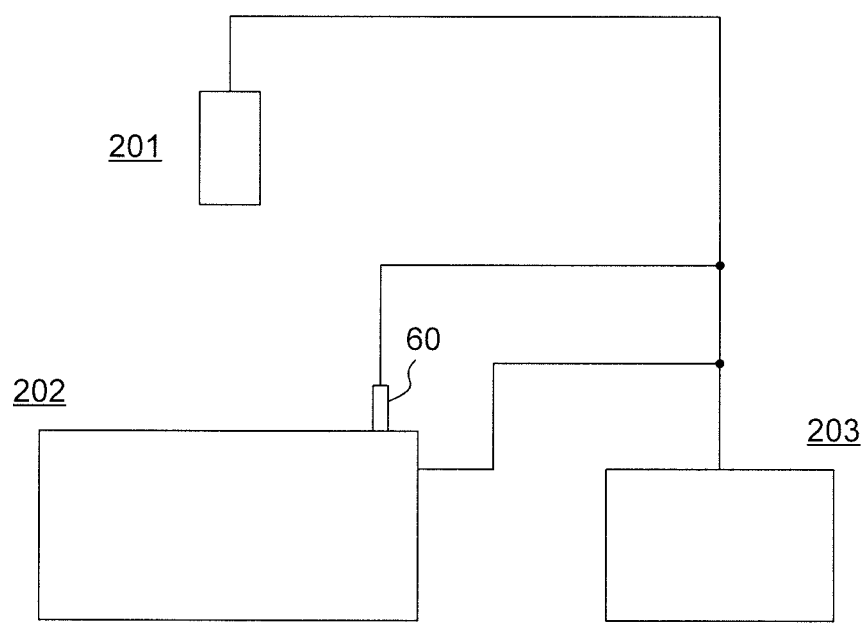
FIG. 13 is a view illustrating a powder bed fusion apparatus of a conventional art.
Figure 14A:
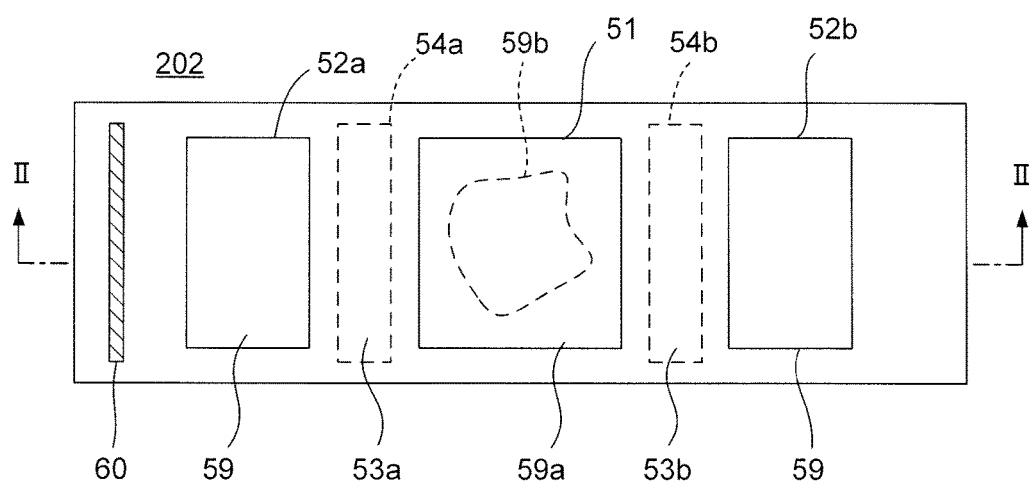
FIG. 14A is a top view illustrating a powder bed fusion apparatus of FIG. 13.
Figure 14B:
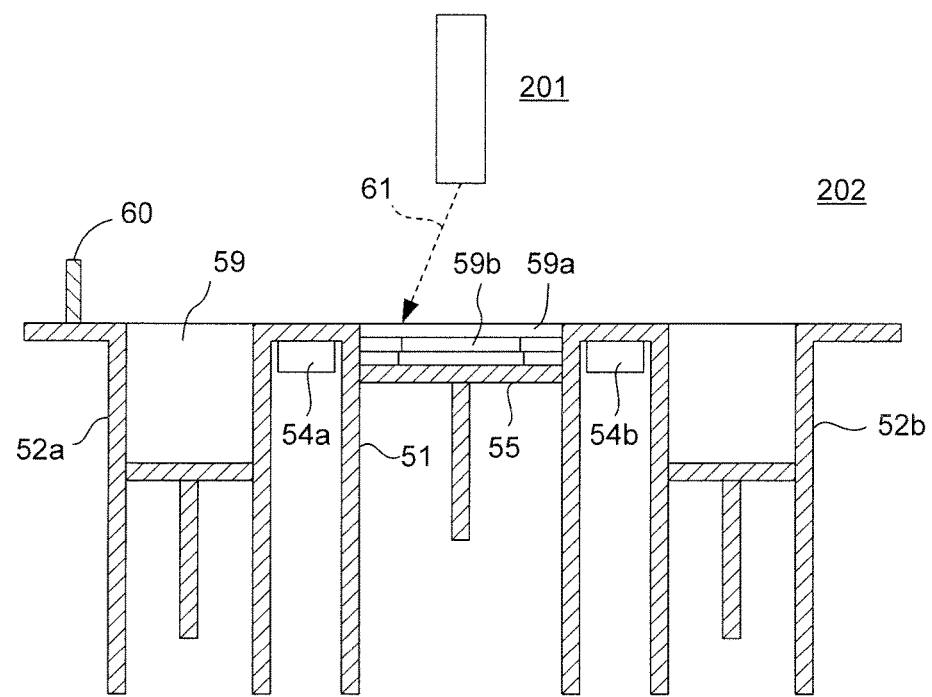
FIG. 14B is cross-sectional view taken along II-II line of FIG. 14A.

FIG. 15A to FIG. 15F are cross-sectional views illustrating a powder bed fusion method of a comparative example which is performed by using the powder bed fusion apparatus of FIG. 13 and FIG. 14.

Figure 15A:
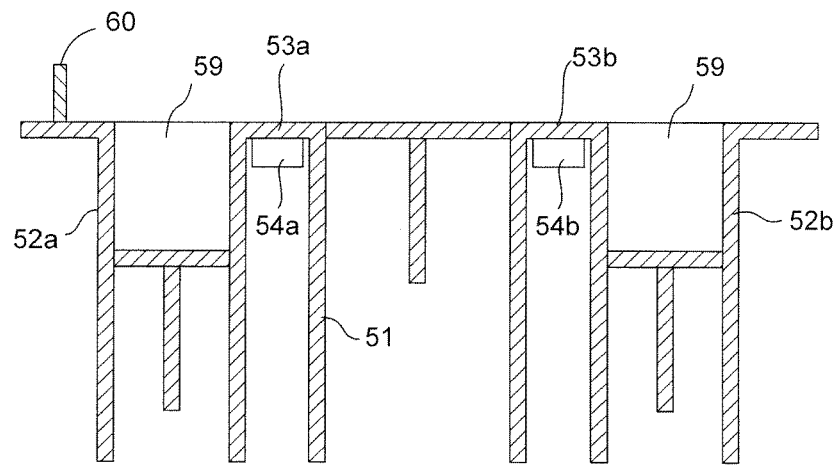
FIG. 15A to FIG. 15F are cross-sectional views explaining a problem of the powder bed fusion method using the apparatus of FIG. 13.

First, as illustrated in FIG. 15A, the left powder material housing container 52a is a feeding side of the first powder material 59, the right powder material housing container 52b is a housing side of the first powder material 59, and the recoater 60 is placed on flange outside the left powder material housing container 52a.

The powder material 59 in the containers 52a, 52b is heated to temperature a little lower than the melting temperature. Further, in order to raise the temperature of the thin layer 59a of the powder material formed in the thin layer forming container 51 to the melting temperature in a short time and to maintain uniformity of temperature in melting, the heaters 54a, 54b or the like are installed under flanges 53a, 53b or the like around the thin layer forming container 51, and heat the material to temperature a little lower than the melting temperature. When temperature of the thin layer 59a reaches predetermined temperature (the lower limit temperature for starting laser beam irradiation) much lower than the temperature a little lower than the melting temperature, irradiation of a laser beam is started.

Figure 15B:
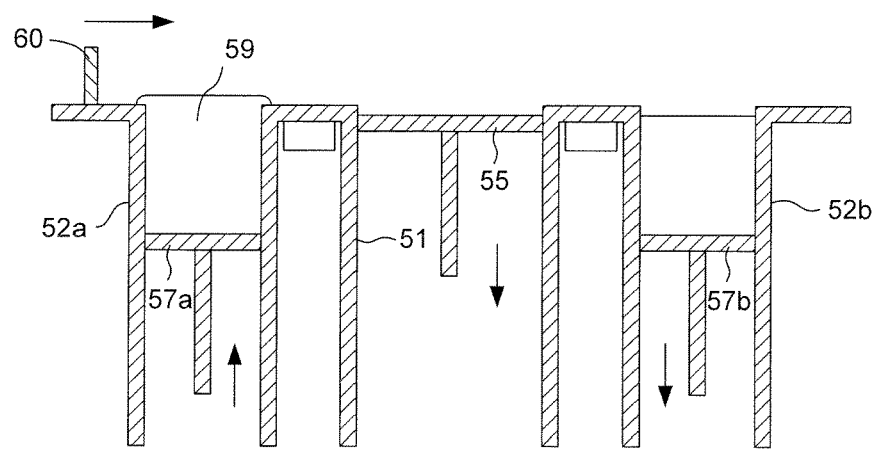

Next, as illustrated in FIG. 15B, a feed table 57b of the right powder material housing container 52b is lowered, the part table 55 of the thin layer forming container 51 is lowered by an amount equivalent to 1 thin layer, and the feed table 57a of the left powder material housing container 52a is elevated to project the powder material 59 on the powder material housing container 52a.

Figure 15C:
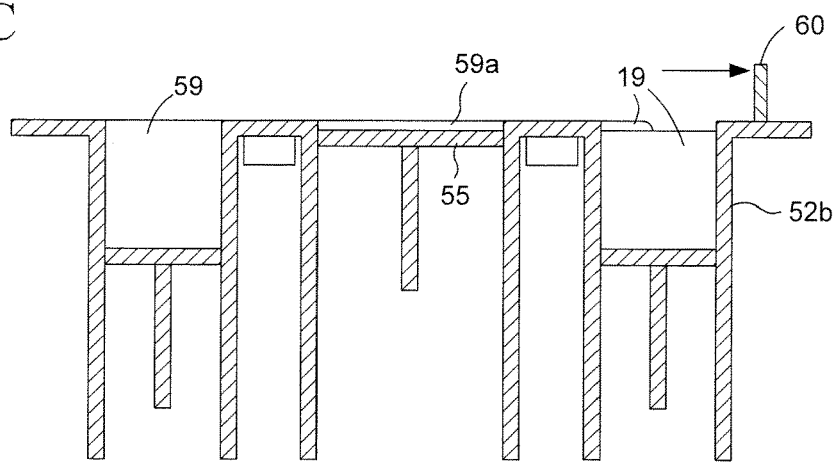

Next, as illustrated in FIG. 15C, the recoater 60 is moved to the right to push forward and take off the protruded powder material 59 and carry to the thin layer forming container 51, and then, level the surface of the material while carrying it into the thin layer forming container 51 to form a thin layer 59a of the powder material as the first layer on the part table 55.

Next, the recoater 60 is further moved to the right to house the residual powder material 59 into the right powder material housing container 52b.

Figure 15D:
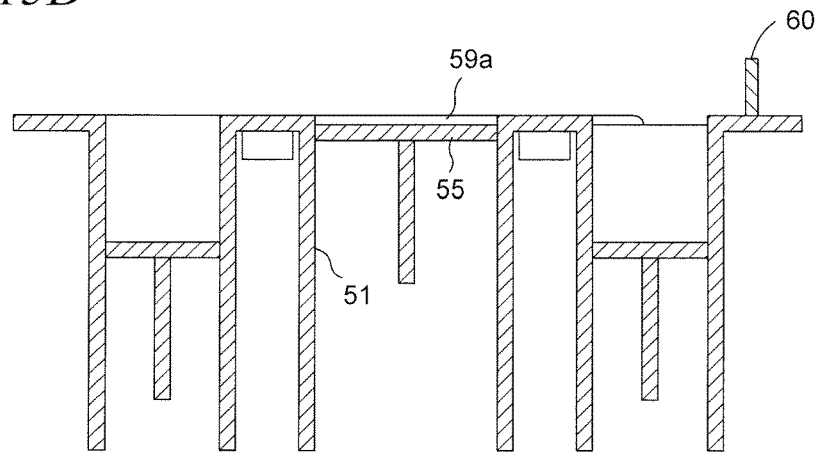

Next, after the residual powder material 59 is housed into the powder material housing container 52b, as illustrated in FIG. 15D, the recoater waits until the temperature of the entire thin layer 59a of the powder material in the thin layer forming container 51 is stabilized at the lower limit temperature for starting laser beam irradiation or higher. Waiting time is approximately 3 seconds.

Figure 15E:
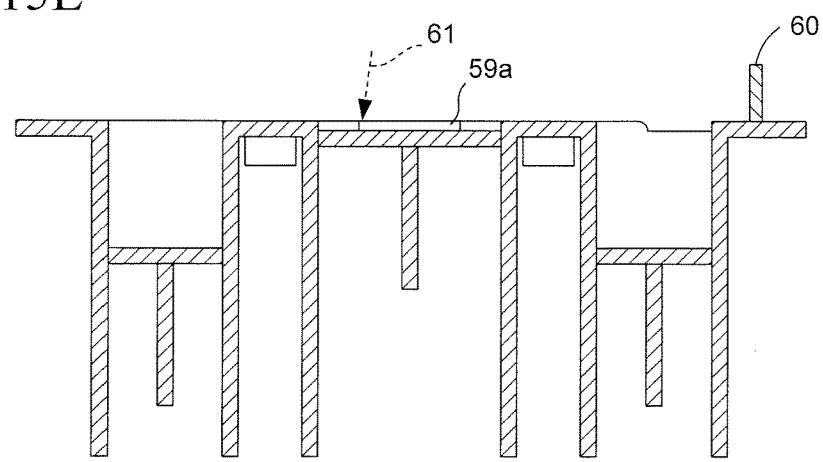
Figure 15F:
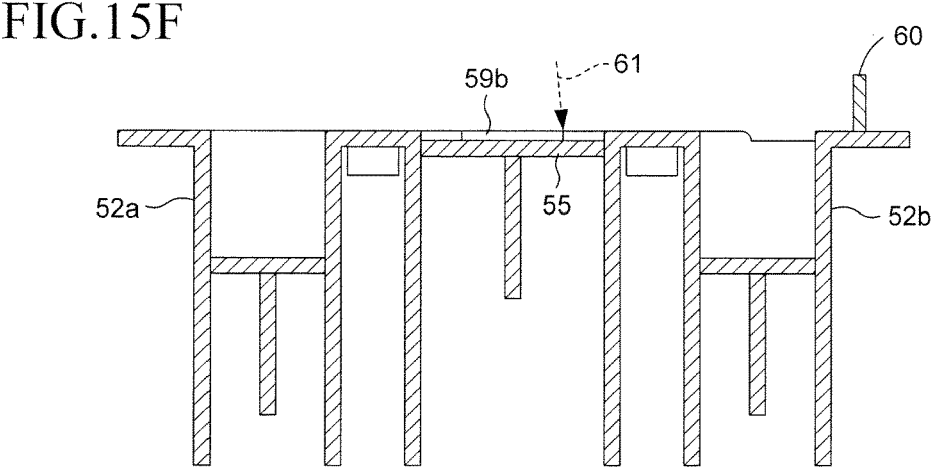

After the temperature of the entire thin layer 59a is stabilized at the lower limit temperature for starting laser beam irradiation or higher, irradiation of the laser beam 61 is started as illustrated in FIG. 15E. Subsequently, as illustrated in FIG. 15F, the thin layer 59a of the powder material as the first layer is selectively melted and solidified by the laser beam 61 to form the subsequently solidified layer 59b as the first layer on the part table 55.

Then, the recoater 60 is moved to the left in the state where the right powder material housing container 52b serves as a feeding side of the powder material and the left powder material housing container 52a serves as a housing side of the residual powder material, and according to the processes of FIG. 15B to FIG. 15C, a thin layer of the powder material as the second layer is formed on the subsequently solidified layer 59b as the first layer.

After that, according to the processes of FIG. 15D to FIG. 15F, the laser beam 61 is irradiated after the temperature of the thin layer of the powder material in the thin layer forming container 51 is stabilized at the lower limit temperature for starting laser beam irradiation or higher, and the thin layer 59a of the powder material as the second layer is selectively melted and solidified to form the subsequently solidified layer 59b as the second layer on the part table 55.

Thereafter, the above-described actions are repeated to stack subsequently solidified layers as the third layer and subsequent layers on the subsequently solidified layer 59b as the second layer, and a required model is fabricated.

As described above, according to the comparative example, 1 cycle includes the following works necessary to form 1 layer of the subsequently solidified layer 59b.

Specifically, those works are the work for lowering the part table 55 and the feed table 57b, and elevating the feed table 57a (FIG. 15B), the work for moving the recoater 60 to push forward and take off the powder material 59 from one powder material housing container 52a, and carrying the material into the thin layer forming container 51 to form the thin layer 59a of the powder material onto the part table 55 (FIG. 15C), the work for further moving the recoater 60 to house the residual powder material 59 into the other powder material housing container 52b (FIG. 15C), the work for waiting until the thin layer 59a of the powder material is stabilized to the lower limit temperature for starting laser beam irradiation or higher (FIG. 15D), and the work for irradiating the thin layer 59a of the powder material with the laser beam 61, and melting and solidifying the layer to form the subsequently solidified layer 59b (FIG. 15E to FIG. 15F).

The same conditions as the above-described example were actually applied to investigate time required for 1 cycle, and the following result was obtained.

Specifically, 1 cycle includes lowering time (Tpd=0.5 second) of the part table 15, time (Tpd=0.5 second) taken the longest out of elevating time and lowering time (Tfu, Tfd=0.5 second for both) of the feed tables 17a, 17b, moving time (T1+T2+T3+T4+T5=8.9 seconds) of the recoater 20 from one powder material housing container 12a or 12b to the other powder material housing container 12b or 12a, waiting time (Tw=3 seconds) until irradiation of a laser beam is started after the powder material is housed into the powder material housing container 12b, and irradiation time (TL=30 seconds) of a laser beam, and required approximately 42.4 seconds in total.

Therefore, in the case of stacking three thousand subsequently solidified layers to complete a model, for example, considerably long time which is approximately 127200 seconds (35.3 hours) was required.

FIG. 10 is a compiled table illustrated for comparing the example of the present application and the comparative example.

In FIG. 10, time required for the work of the example is compared in a corresponding manner to time (T1, T2, Tpd, T3, T4, Tw, TL, T5) required for each work which is necessary for forming 1 layer of the subsequently solidified layer 59b in the comparative example.

In the table, ○ marks denote works that need to be performed separately from irradiation of a laser beam, and are not targets for shortening time. On the other hand, x marks denote works that can be performed in a concurrently running manner during irradiation of a laser beam, and are targets for shortening time.

Further, corresponding drawings (FIG. 9H to FIG. 9M) were given to respective works of the example, and corresponding drawings (FIG. 15B to FIG. 15F) were given to respective works of the comparative example.

As described in the table, in the example, time (T3+T4+T5) required for the work of the recoater 20 in the comparative example can be performed in a concurrently running manner during irradiation of the laser beam 21, and wait time (Tw) for raising the temperature of the thin layer of the comparative example is unnecessary.

Specifically, in the example, approximately 8.3 seconds can be shortened per one subsequently solidified layer as compared with the comparative example. Consequently, in the case where three thousand subsequently solidified layers are stacked in order to complete a model, about 24900 seconds (6.92 hours) can be shortened.

Note that the time (Tfd) required for lowering the feed table 17a or 17b illustrated in FIG. 9H is not counted as time required for 1 cycle in the example. Because in the comparative example as well, the time is not counted as time required for 1 cycle since lowering of the feed table is performed simultaneously in lowering the part table 15 as illustrated in FIG. 15B.

Further, similarly, the time (Tfu) required for elevating the feed table 17a or 17b illustrated in FIG. 9L is not counted as target time to be shortened as well.

As described above, according to the embodiment of the present invention, a time-shortening rate of approximately 19.3% was obtained compared to the comparative example.

Note that the above-described work times (T1, T2, T3, T4, Tw, TL, T5) fluctuate according to a size of the powder bed fusion apparatus, a moving speed of the recoater, a shape of the model or the like, and thus an effect of shortening time also fluctuates.

For example, irradiation time of a laser beam significantly fluctuates according to the shape of the model. In case that the irradiation time of a laser beam is shorter, an effect of shortening time becomes more significant.

Second Embodiment

Figure 11A:
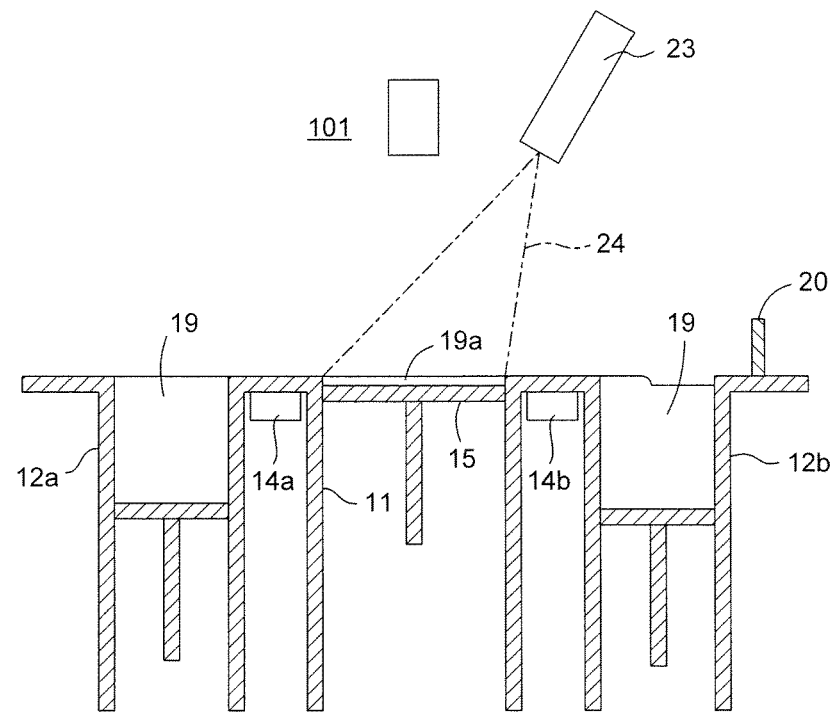
FIG. 11A and FIG. 11B are cross-sectional views illustrating a powder bed fusion apparatus and a powder bed fusion method according to a second embodiment of the present invention.
Figure 11B:
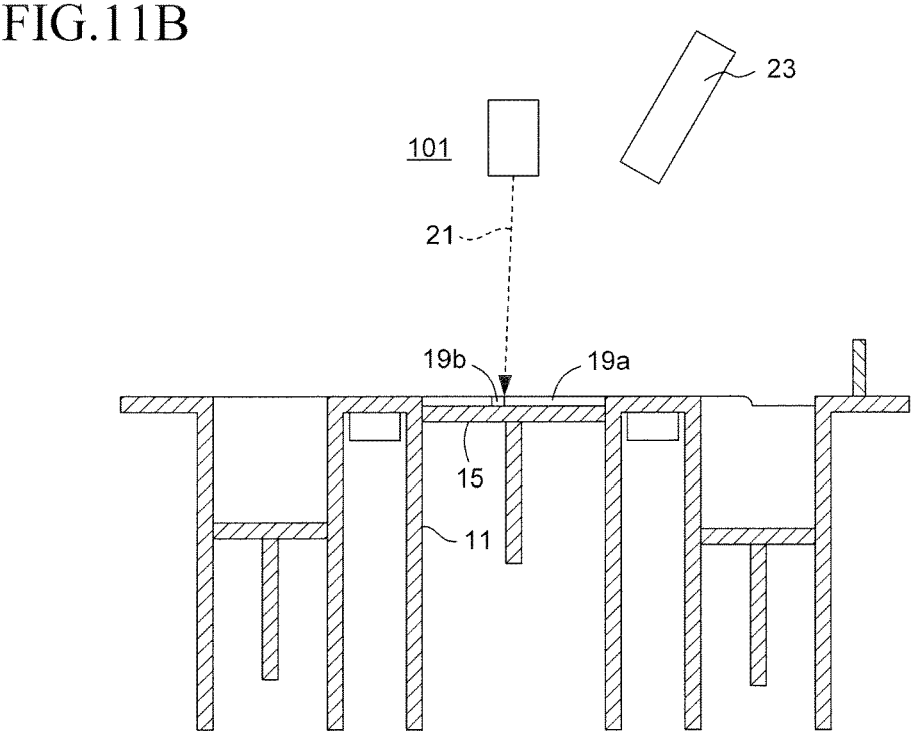

FIG. 11A, FIG. 11B are cross-sectional views illustrating the powder bed fusion apparatus and the powder bed fusion method according to the second embodiment.

The powder bed fusion apparatus of this embodiment is different from the powder bed fusion apparatus of FIG. 1 on the point that the apparatus is equipped with temperature measuring means 23. The temperature measuring means 23 taken for use is a thermal image sensor (thermography) capable of measuring temperature distribution at the surface of the thin layer 19a of the powder material at once by infrared ray 24, for example.

Figure 12:
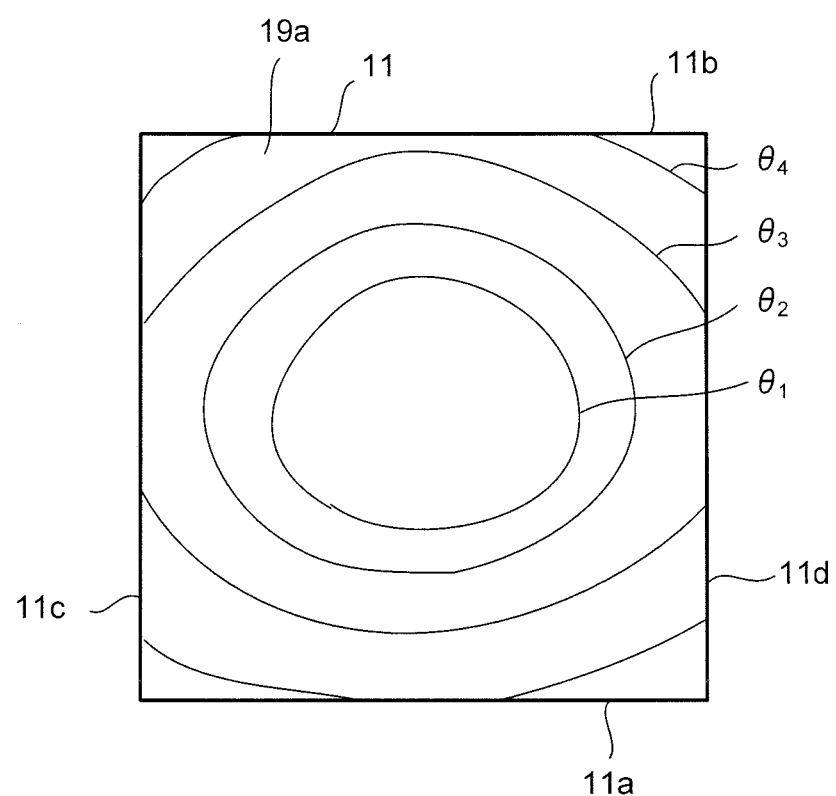
FIG. 12 is a plan view illustrating temperature distribution at a surface of the thin layer of the powder material which is measured at a certain time in the powder bed fusion method of the second embodiment of the present invention.

In the powder bed fusion method according to this embodiment, the thermal image sensor 23 measures the temperature distribution at the surface of the thin layer 19a of the powder material every constant elapsed time from immediately after the formation of the thin layer 19a. FIG. 12 illustrates the temperature distribution at the surface of the thin layer 19a of the powder material, which was measured at certain elapsed time. In the drawing, reference symbols $\theta_1$ to $\theta_4$ denote isothermal lines in accordance with absolute values of temperature at a 5° C. gap, for example. Note that reference numeral 11 denotes a thin layer forming container. Reference numerals 11a, 11b, 11c, 11d denote a front rim, a rear rim, a left rim and a right rim of the thin layer forming container 11, respectively.

Next, based on the measured temperature distribution at the surface, the temperature-stabilized region is identified on the X-Y coordinate. In this case, since isothermal lines often do not necessarily match the lower limit temperature for starting laser beam irradiation of FIG. 25, an inside of the isothermal line located at the lower limit temperature for starting laser beam irradiation or higher is regarded as the temperature-stabilized region.

Note that the temperature-stabilized region is a temperature range which is lower than the melting temperature of the powder material and not lower than predetermined temperature.

For example, in the case of resin powder, the lower limit is temperature lower than the melting temperature by 50° C., and the upper limit is temperature lower than the melting temperature by 10° C.

On the other hand, the case of the metal powder is also based on the case of resin powder. In this case, the melting temperature of metal is considerably higher than that of resin, and therefore, a wider range is better for the lower limit temperature in contrast to that lower than the melting temperature by 50° C. in the case of resin.

The above-described lower limit temperature corresponds to the lower limit temperature for starting laser beam irradiation of FIG. 16B.

Next, based on FIG. 4A to FIG. 4F or FIG. 5A to FIG. 5E, and FIG. 6A to FIG. 6B, the entire region or a partial region of the slice data inside the temperature-stabilized region is identified. Then, with respect to the thin layer 19a of the identified region a laser beam is moved, irradiated while being turned back according to any of FIG. 8A to FIG. 8D to melt and solidify the thin layer 19a.

After that, measurement of the temperature distribution at the surface, identification of the temperature-stabilized region, and movement and irradiation of a laser beam are repeated corresponding to the lapse of time to form a subsequently solidified layer corresponding to the slice data. These actions are repeated over a plurality of layers to form a model.

As described above, according to the second embodiment, the temperature-stabilized region can be identified more accurately based on actual measurement of temperature. Therefore, time required for modeling can be shortened, and in the subsequently solidified layer and eventually a completed model, thermal strain due to unevenness of temperature distribution is suppressed more certainly, and thus, warp can be suppressed.

Further, particularly in the case of metal, thermal conductivity is constant in a lump thereof. So, if the thin layer is formed by the lump, it can be assumed that temporal changes of temperature distribution have small fluctuation every time the thin layer is formed. On the other hand, if the thin layer is formed by powder, particles are distributed with various particle sizes over the thin layer and are in point contact with each other. Therefore, parameters regarding heat, such as the entire thermal conductivity, could significantly fluctuate depending on a mixed condition of powder every time the thin layer is formed. For this reason, prediction of temporal changes of temperature distribution could be difficult. In such a case, the fusion method of this embodiment which is performed together with measuring temperature distribution by the thermal image sensor is extremely useful.

This invention has been explained above in detail based on the embodiments, but the scope of this invention is not limited to the examples specifically described in the above-described embodiments, modifications of the above-described embodiments within a range without departing from the gist of the present invention are incorporated in this invention.

For example, though as illustrated in FIG. 3, 6 squares inscribed to the respective concentric circles are set based on 6 concentric circles drawn corresponding to elapsed time from the center (C) of the inner top surface of the thin layer forming container 11, the invention is not limited to the aspect. A divided region to be set may be a shape similar to the shape of the inner edge portion of the thin layer forming container 11. Further, a divided region may be not necessarily similar to the shape of the inner edge portion of the thin layer forming container 11. The divided region may be a circle or an ellipse, a triangle or a rectangle, or other polygons.

Further, though as illustrated in FIG. 7A and FIG. 7B, the divided region is set according to temporal changes of the temperature distribution based on the square unit region of division, the invention is not limited to the aspect. The unit region of division to be set may be a triangle or a rectangle, other polygons.

What is claimed is:

1. A powder bed fusion apparatus, comprising:
   an energy beam emitting section for outputting an energy beam;
   a thin layer forming section for forming a thin layer of a powder material;
   preliminary heating means for pre-heating the thin layer of the powder material,
   wherein
   the thin layer forming section includes:
      a first container housing the powder material;
      a second container housing the powder material;
      a third container which is placed between the first container and the second container, and on which a thin layer of the powder material is formed; and
      a carrying member which moves between the first container, the third container, and the second container, and carries the powder material,
   control means for controlling modeling, wherein
   the control means performs:
      forming a thin layer of the powder material, in which the carrying member is moved to carry out the powder material from the first container and then carry the powder material into the third container;
      pre-heating the thin layer of the powder material; and
      forming a first subsequently solidified layer based on slice data, in which irradiation of the energy beam is started from the central region of the thin layer, and sequentially moved to a peripheral region of the thin layer,
   on the other hand, during the forming the first subsequently solidified layer after the forming the thin layer of the powder material, the control means performs:
   moving the carrying member to house the powder material which is residual after the forming the thin layer of the powder material into the second container, and then carry out the powder material from the second container and further carry the powder material to the front of the third container,
   wherein the preliminary heating means includes heaters, each of which is located in each partition wall of the first container, the second container, and the third container.

2. The powder bed fusion apparatus according to claim 1, wherein
   after the forming the first subsequently solidified layer, the control means performs:
   forming a thin layer of the powder material on the first subsequently solidified layer, in which the carrying member is moved to carry the powder material carried to the front of the third container into the third container;
   pre-heating the thin layer of the powder material; and
   forming a second subsequently solidified layer based on slice data, in which irradiation of the energy beam is started from the central region of the thin layer, and sequentially moved to a peripheral region of the thin layer,
   on the other hand, during the forming the second subsequently solidified layer after the forming the thin layer of the powder material on the first subsequently solidified layer, the control means performs:
   moving the carrying member to house the powder material which is residual after the forming the thin layer of the powder material into the first container, and then carry out the powder material from the first container and further carry the powder material to the front of the third container.

3. A powder bed fusion apparatus, comprising:
   an energy beam emitting section for outputting an energy beam;
   a thin layer forming section for forming a thin layer of a powder material which is irradiated with the energy beam;
   preliminary heating means for pre-heating the thin layer of the powder material;
   temperature measuring means for measuring temperature distribution at a surface of the thin layer of the powder material,
   wherein
   the thin layer forming section includes:
      a first container housing the powder material;
      a second container housing the powder material;
      a third container which is placed between the first container and the second container, and on which a thin layer of the powder material is formed; and
      a carrying member which moves between the first container, the third container, and the second container, and carries the powder material,
   control means for controlling modeling, wherein
   the control means performs:
      forming a thin layer of the powder material, in which the carrying member is moved to carry out the powder material from the first container and to carry the powder material into the third container;
      pre-heating the thin layer of the powder material; and
      forming a first subsequently solidified layer, by subsequently repeating
      measuring temperature distribution at a surface of the thin layer by the temperature measuring means,
      identifying the partial region of the thin layer of the powder material which is included within a temperature range lower than the melting temperature of the powder material and predetermined temperature or higher based on the measured temperature distribution, irradiating the partial region with the energy beam to melt and solidify the region based on slice data, and on the other hand, during the forming the first subsequently solidified layer after the forming the thin layer of the powder material, the control means performs moving the carrying member to house the powder material which is residual after the forming the thin layer of the powder material into the second container, and then carry out the powder material from the second container and carry the material to the front of the third container, wherein the preliminary heating means are provided around the first container, the second container, and the third container.

4. The powder bed fusion apparatus according to claim 3, wherein after the forming the first subsequently solidified layer, the control means performs:

forming a thin layer of the powder material on the first subsequently solidified layer, in which the carrying member is moved to carry the powder material carried to the front of the third container into the third container;

pre-heating the thin layer of the powder material; and forming a second subsequently solidified layer by subsequently repeating measuring temperature distribution at a surface of the thin layer, identifying a partial region of the thin layer of the powder material, and irradiating the partial region with the energy beam to melt and solidify the region, and on the other hand, during the forming the second subsequently solidified layer after the forming the thin layer of the powder material, the control means performs moving the carrying member to house the powder material which is residual after the forming the thin layer of the powder material into the first container, and then carry out the powder material from the first container, and further carry the powder material to the front of the third container.

* * * * *